(12) United States Patent
Matsumoto et al.

(10) Patent No.: US 7,395,149 B2
(45) Date of Patent: Jul. 1, 2008

(54) NAVIGATION APPARATUS

(75) Inventors: Shuichi Matsumoto, Iwaki (JP);
Takayuki Ogino, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 774 days.

(21) Appl. No.: 10/858,490

(22) Filed: Jun. 1, 2004

(65) Prior Publication Data
US 2005/0021227 A1 Jan. 27, 2005

(30) Foreign Application Priority Data
Jun. 6, 2003 (JP) ............................. 2003-162232

(51) Int. Cl.
*G06F 7/00* (2006.01)
(52) U.S. Cl. ...................... 701/207; 340/988
(58) Field of Classification Search ................... 701/23, 701/25, 202, 200, 201, 207–209, 211–214; 340/988, 990, 995; 73/178 R
See application file for complete search history.

(56) References Cited

U.S. PATENT DOCUMENTS

| | | | |
|---|---|---|---|
| 5,103,400 A * | 4/1992 | Yamada et al. ............... | 701/202 |
| 6,144,318 A * | 11/2000 | Hayashi et al. ......... | 340/995.19 |
| 6,317,686 B1 * | 11/2001 | Ran ............................. | 701/210 |
| 6,374,182 B2 * | 4/2002 | Bechtolsheim et al. ....... | 701/209 |
| 6,421,606 B1 * | 7/2002 | Asai et al. .................... | 701/209 |
| 6,675,089 B2 | 1/2004 | Hirabayashi et al. | |

FOREIGN PATENT DOCUMENTS

| | | |
|---|---|---|
| JP | 07-57188 | 3/1995 |
| JP | 07-83685 | 3/1995 |
| JP | 08106597 | 4/1996 |
| JP | 10-134293 | 5/1998 |
| JP | 2002-22464 | 1/2002 |
| JP | 2002-257579 | 9/2002 |
| JP | 2002-269291 | 9/2002 |
| JP | 2002-323340 | 11/2002 |
| JP | 2003-57057 | 2/2003 |
| JP | 2003214869 | 7/2003 |

* cited by examiner

*Primary Examiner*—Dalena Tran
(74) *Attorney, Agent, or Firm*—Brinks Hofer Gilson & Lione

(57) ABSTRACT

When a vehicle is traveling along a route toward a parking lot located near a destination facility, if traffic congestion along the route is detected, the navigation apparatus searches for an alternative parking lot that allows a user to reach the destination facility earlier than can by using the original parking lot. If such an alternative parking lot is detected, the predicted driving time and the predicted walking time are displayed together with a route to the parking lot. When traffic congestion is encountered when transporting a passenger by vehicle, the navigation apparatus determines a quicker way for the passenger to reach the destination facility. If the navigation apparatus detects that the passenger can reach the destination facility earlier if the passenger disembarks the vehicle and walks to the destination facility, the navigation apparatus presents information indicating a best point at which the passenger should disembark the vehicle.

16 Claims, 19 Drawing Sheets

NAVIGATION APPARATUS

BACKGROUND OF THE INVENTION

1. Field of the Invention

The present invention relates to a navigation apparatus for guiding a vehicle to a destination, and more particularly, to a navigation apparatus capable of providing guidance such that when the vehicle is traveling toward the destination or a parking lot near the destination in accordance with the guidance, if traffic congestion occurs in an area near the destination, a more suitable parking lot other than the parking lot originally planned to be used is selected and guidance to the selected parking lot is provided or a point suitable for a passenger to get off the vehicle and walk to the destination is selected and guidance to the selected point is provided.

2. Description of the Related Art

A navigation apparatus includes a map/information storage medium such as a CD-ROM, a DVD-ROM, or a hard disk on which map data used to display a map, place name data indicating place names displayed on the map, and information data used to search for facilities or the like are stored. The navigation apparatus also includes a data input/output device for reading or writing data from or onto the map/information storage medium, a display for displaying a map and other information, a vehicle position detector for detecting the current vehicle position and traveling direction in cooperation with a GPS receiver or a self-contained navigation unit such as a distance sensor or a gyroscope. Map data including data indicating the current position of a vehicle is read from the map/information storage medium, and, in accordance with the read map data, a map image of an area in which the vehicle is currently located is displayed on the screen of the display and a mark indicating the position of the vehicle is displayed in a superimposed fashion on the screen of the display. As the vehicle moves, the map image displayed on the screen is scrolled or the mark indicating that the vehicle position has moved while maintaining the map image unmoved so that a user can easily recognize the current position of the vehicle.

The navigation apparatus has the capability of providing route guidance that allows a user to get to a desired destination simply by driving along a route guided by the navigation apparatus. More specifically, suitable routes from a start point to a specified destination are automatically searched for using the map information from numerous possible routes, taking into account the distance, the driving time, the fee, and other factors, and the detected routes are displayed. If a user selects a route from those detected routes, the selected route is stored in a memory as a navigation route. When the vehicle is moving, the route along which to guide the vehicle is displayed on the map image by a bold line with a color different from the color of the other roads. When the vehicle has come to a point within a predetermined range from an intersection at which to make a right or left turn according to the route, an intersection image is displayed in an enlarged fashion, and an arrow indicating the direction of a turn is displayed, or voice information is provided to indicate the direction of the turn.

When the vehicle is moving toward the destination in accordance with route guidance provided by the navigation apparatus, if traffic congestion is detected in an area, for example, near a station specified as the destination or if traffic congestion is detected along the route to the destination, the navigation apparatus immediately searches for a detour route to the destination and displays the detected detour route. If the user selects to drive along the detour route, the navigation apparatus provides route guidance along the detour route. An example of a technique of presenting a detour route as an alternative route when traffic congestion is detected may be found in a patent filed by the present applicant and published as Japanese Unexamined Patent Application Publication No. 08-106597.

In the conventional navigation apparatus, as described above, when traffic congestion occurs on a navigation route, a detour route to avoid the traffic congestion is searched for, and navigation guidance to a destination is provided along the detected detour route. However, for example, when a department store is specified as a destination facility, in an area close to the department store, there may be plural parking lots for dedicated or semi-dedicated use by visitors to the department store. Such a situation presents the possibility that when traffic congestion occurs in an area near the destination facility, use of a parking lot farther from the destination facility allows earlier arrival at the department store specified as the destination facility than driving along a detour route to a parking lot closer to the destination facility, although a longer walking time from the parking lot to the destination facility is needed.

Furthermore, when a passenger other than a driver of a vehicle wants to arrive at a destination facility such as a department store, there is a possibility that getting out of the vehicle at a point before the destination facility and walking therefrom to the destination facility allows earlier arrival than further driving through a congested route to the destination. In some cases, a faster way to reach the department store is to get off the vehicle near a station, get on a train at that station and travel by train to a station close to the department store, and subsequently walk from that station to the department store. Thus, it is very useful to provide information about such a route, including a walking route or a train route. However, the conventional navigation apparatus does not have such a capability.

On the other hand, in a case in which a station is set as a destination to which to take a passenger by vehicle, if traffic congestion occurs in an area near the station, the conventional navigation apparatus simply searches for a detour route to avoid the traffic congestion and presents a detected detour route to a user. However, in such a situation, there is a possibility that the passenger can arrive at the station earlier if he/she gets off the vehicle at a proper point and walks therefrom to the station, rather than traveling further along the detour route by vehicle. For example, in a case in which a passenger is taken by vehicle to a destination facility at which the passenger is going to take an entrance examination or the like, it is very important for the passenger to arrive at the destination by a specified time. In such a case, rather long walking is allowed if walking results in earlier arrival.

In such a case, there is a possibility that the passenger can arrive at the final destination if the passenger gets off the vehicle, not at an originally planned station nearby an area which has traffic congestion, but at another station, although the train route may become longer. However, the conventional navigation apparatus cannot provide such guidance information.

SUMMARY OF THE INVENTION

In view of the above, it is an object of the present invention to provide a navigation apparatus having not only a simple capability of presenting a detour route when traffic congestion occurs but also having a capability of presenting a good point at which to get off a vehicle and go to a final destination by train or on foot and a capability of searching for a better alternative parking lot and a route thereto rather than an originally targeted parking lot located near an area which is congested, taking into account not only driving time but also walking time.

In an aspect, to achieve the above object, the present invention provides a navigation apparatus comprising a destination location storage means for storing the location of a destination, a route calculation means for calculating at least a route to a parking lot located near the destination, a predicted driving time calculation means for calculating the predicted driving time needed to get to the parking lot located near the destination facility, a predicted walking time calculation means for calculating the predicted walking time needed to get to the destination facility from the parking lot on foot, a predicted total time calculation means for determining the predicted total time by calculating the sum of the predicted driving time and the predicted walking time, a congestion information detection means for detecting at least traffic congestion along the route in an area near the destination, and a parking lot search means for searching for parking lots such that when the congestion detection means detects traffic congestion in the area near the destination, the parking lot search means searches for an alternative parking lot that will result in a shorter predicted total time, wherein the route calculation means calculates a navigation route to the alternative parking lot.

In the navigation apparatus in this aspect, when a vehicle travels to a parking lot located near a destination, if traffic congestion occurs near the destination, a more suitable parking lot other than the parking lot an originally planned to be used is selected on the basis of the necessary total time, calculated by the predicted total time calculation means, including not only the driving time but also the walking time, and a navigation route to the selected parking lot is set. Data indicating the location of the destination is stored in the destination location storage means, so that it is possible to quickly calculate the time needed to walk to the destination from the newly selected parking lot.

In this navigation apparatus, the congestion detection means may detect traffic congestion that occurs when a vehicle is traveling. This makes it possible to immediately deal with traffic congestion when the traffic congestion occurs. If traffic congestion occurs, the predicted total time including a walking time is calculated, and a suitable parking lot and a suitable route thereto are selected.

In the navigation apparatus according to the present invention, the route calculation means may include detour route calculation means for calculating a detour route for avoiding traffic congestion detected by the current congestion information acquisition means, and route selection screen forming means for presenting to a user the detour route calculated by the detour route calculation means and the navigation route to the alternative parking lot. In this navigation apparatus, when a navigation route to a newly selected parking lot other than the parking lot originally planned to be used is searched for in response to detection of traffic congestion, a user can compare the suggested new route with the detour route selected, and the user can select a suitable route according to the comparison result.

In the navigation apparatus, the navigation route to the alternative parking lot presented to the user is a route to an alternative parking lot that has a shorter predicted total time than the predicted total time needed when employing a detour route to an originally targeted parking lot avoiding traffic congestion detected by the current congestion information acquisition means. That is, when traffic congestion is detected, the navigation apparatus presents only a route to an alternative parking lot that allows the user to reach the destination in a shorter total time than is allowed when employing a detour route determined according to the same technique as that used by the conventional navigation apparatus, and no necessary information is displayed.

The navigation apparatus according to the present invention may further include a congestion relaxation monitor means for monitoring, when traveling along the navigation route to the alternatively selected parking lot, whether traffic congestion along the route originally planned to be used has disappeared, wherein if the congestion relaxation monitor means detects that the traffic congestion on the route originally planned to be used has disappeared, the navigation apparatus provides route guidance along the route originally planned to be used. In this navigation apparatus, when the vehicle is traveling along the navigation route to an alternative parking lot selected in response to the detection of traffic congestion, if traffic congestion on the route originally planned to be used disappears, the running route is immediately returned to the original route.

In the navigation apparatus according to the present invention, if a vehicle has passed through a point at which the navigation route to the alternatively selected parking lot is branched from the route originally planned to be used, the congestion relaxation monitor means may stop the monitoring operation. In this aspect, when the vehicle is traveling along the navigation route to an alternative parking lot selected in response to the detection of traffic congestion, if traffic congestion along the route originally planned to be used disappears, the running route can be immediately returned to the original route. However, if the vehicle has already run a rather large distance after passing through a point at which the navigation route to the alternatively selected parking lot is branched from the route originally planned to be used, returning to the original route is not desirable. If this is the case, undesirable route guidance is not provided.

In the navigation apparatus according to the present invention, the traffic congestion information may be obtained by means of a vehicle-to-vehicle communication. This makes it possible to properly select an alternative parking lot and a proper route thereto on the basis of highly reliable information about congestion obtained from a vehicle being actually in congestion.

In another aspect, the present invention also provides a navigation apparatus comprising a destination location storage means for storing the location of a destination, a route calculation means for calculating at least a route to a nearby parking lot in an area near the destination, a predicted driving time calculation means for calculating the predicted driving time needed to get to the parking lot, a predicted walking time calculation means for calculating the predicted walking time needed to get to the destination from the parking lot on foot, a predicted total time calculation means for determining the predicted total time by calculating the sum of the predicted driving time and the predicted walking time, and a parking lot selection means for selecting a parking lot that has the shortest predicted total time. In the navigation apparatus in this aspect, a suitable parking lot at a destination can be selected from various possible parking lots taking into account not only the predicted driving time to each parking lot but also the predicted total time including the walking time from the parking lot to the destination facility.

The navigation apparatus according to the present invention may further include a predicted congestion information acquisition means for acquiring information associated with traffic congestion predicted to occur at a time at which to leave the destination, wherein when the traffic congestion information acquired by the predicted congestion information acquisition means indicates that traffic condition will probably occur in an area near the destination at a time at which to leave the destination, the parking lot selection means selects a parking lot that has the shortest predicted total time calculated taking into account the predicted traffic congestion. In this navigation apparatus, when traffic congestion information indicates that traffic condition will probably occur in an area near a destination at a time at which to leave the destination for a next destination, which may be an original start point, a suitable parking lot and a suitable route thereto are selected taking into account various factors including the predicted traffic congestion and the predicted walking time from the parking lot to the destination facility.

In the navigation apparatus according to the present invention, the normal navigation route calculation means may calculate a navigation route from the destination to a next destination, and when the traffic congestion information acquired by the predicted congestion information acquisition means indicates that traffic condition will probably occur on the navigation route from the current destination to the next destination at a time at which to leave the current destination, the parking lot selection means may select a parking lot that has the shortest predicted total time calculated taking into account the traffic congestion. In this navigation apparatus, when traffic congestion information indicates that the traffic condition will probably occur in an area near a destination at a time at which to leave the destination, in particular when traffic congestion is predicted to occur on a planned route along which to run, a suitable parking lot and a suitable route thereto are selected taking into account various factors including the predicted traffic congestion and the predicted walking time from the parking lot to the destination facility.

In an aspect, the present invention also provides a navigation apparatus comprising destination location storage means for storing the location of a destination, a normal navigation route calculation means for calculating at least a route to the destination, a predicted driving time calculation means for calculating the predicted driving time needed to get to an arbitrary point on the route, a predicted walking time calculation means for calculating the predicted walking time needed to get to the destination from the arbitrary point on foot, and a passenger's getting-off point guidance means for presenting information indicating a getting-off point suitable for a passenger to get off a vehicle, wherein the passenger's getting-off point guidance means detects such a point that the predicted walking time needed for the passenger to get off the vehicle at that point and walk to the destination is shorter than the predicted driving time from that point to the destination, and the passenger's getting-off point guidance means presents the detected point as the getting-off point. In this navigation apparatus, when traffic congestion is encountered on the way to a destination to which to take a passenger by vehicle, the navigation apparatus detects, using the capability of calculating the walking time, such a point that the passenger can arrive at the destination earlier if the passenger gets off the vehicle at that point and walks from that point to the destination rather than going further by vehicle, and the navigation apparatus presents information about the getting-off point.

In an aspect, the present invention also provides a navigation apparatus comprising destination location storage means for storing the location of a destination, a normal navigation route calculation means for calculating at least a route to the destination, a predicted driving time calculation means for calculating the predicted driving time needed to get to an arbitrary point on the route, a predicted walking time calculation means for calculating the predicted walking time needed to get to the destination from the arbitrary point on foot, a predicted total time calculation means for determining the predicted total time by calculating the sum of the predicted driving time and the predicted walking time, and a passenger's getting-off point guidance means for presenting information indicating a getting-off point suitable for a passenger to get off a vehicle, wherein the passenger's getting-off point guidance means detects such a point that the predicted walking time needed for the passenger to get off the vehicle at that point and walk to the destination is shorter than the predicted total time including the predicted driving time from the point to a parking lot and the predicted walking time from the parking lot to the destination, and the passenger's getting-off point guidance means presents the detected point as the getting-off point. In this navigation apparatus, when traffic congestion is encountered when traveling toward a parking lot, the navigation apparatus detects such a point that a passenger can arrive at the destination earlier if the passenger gets off the vehicle at that point and walks from that point to the destination rather than going further by vehicle, and the navigation apparatus presents information about the getting-off point. This allows the passenger to get off the vehicle and spend time efficiently without remaining in the vehicle for a longer than necessary time.

The navigation apparatus according to the present invention may further comprise a destination location detection means for determining whether the destination facility is located close to a point on the navigation route, wherein the passenger's getting-off point guidance means may present a getting-off point such that when the destination location detection means detects that the destination facility is located close to a point on the navigation route, if the passenger's getting-off point guidance means detects that the predicted walking time from the current position to the destination facility is shorter than the predicted driving time from the current position to the point close to the destination facility, the passenger's getting-off point guidance unit presents the current position as the getting-off point suitable for the passenger to get off the vehicle. In this navigation apparatus, in a case in which a vehicle travels toward a parking lot along a navigation route, if a destination facility is located close to a point on the navigation route and before the parking lot, when the vehicle comes close to the destination facility, a passenger can get off the vehicle and can walk to the destination facility. This allows the passenger to walk for a shorter time than needed from the parking lot to the destination facility, and thus the passenger can spend time efficiently.

The navigation apparatus according to the present invention may further comprise a schedule reading means for reading, from schedule data, an arrival time by which a user has to arrive at a destination, a destination arrival time prediction means for calculating the predicted arrival time at the destination, and a schedule checking means for checking a schedule to determine whether the current running state allows arrival by the specified time by which a user has to arrive at the destination by comparing the predicted arrival time at the destination with the time specified by the schedule. In this navigation apparatus, when a vehicle encounters traffic congestion, the navigation apparatus periodically calculates the influence of the traffic congestion on the schedule of the user and informs the user of the predicted influence. If it is predicted that the current running state will not allow the user to arrive at the destination by the specified time, the user can do something to deal with the traffic congestion.

The navigation apparatus according to the present invention may further include a means for acquiring information about other transportation means including a train available from a getting-off point to the destination, wherein if the comparison of the predicted arrival time at the destination with the specified time by which the user has to arrive at the destination indicates that the current running state does not allow arrival by the time specified by the schedule, the schedule checking means searches for a best way to reach the destination by the specified time by using other traffic transportation means including trains. In this navigation apparatus, when the checking of the schedule indicates that the current running state does not allow arrival by the time specified by the schedule, the navigation apparatus presents guidance information suggesting that the user can reach the destination by the specified time if a train is used.

In the navigation apparatus according to the present invention, the normal navigation route calculation means calculates a route including a walking route from a getting-off point to the destination, and displays the resultant route on the navigation apparatus. In this navigation apparatus, when the vehicle arrives, for example, at a parking lot, the user can get information from the display of the navigation apparatus about a walking route from the parking lot to the destination facility.

In the navigation apparatus according to the present invention, the normal navigation route calculation means may calculate a route including a walking route from a getting-off point to the destination, and may transmit the resultant route to a portable information device of the user. That is, a route along which to walk, for example, from a parking lot to a destination facility is calculated by the navigation apparatus, and information indicating the calculated route is transmitted to a portable information device such as a portable telephone or a portable information terminal of the user. In accordance with the route displayed on the portable information device, the user can walk to the destination facility.

The navigation apparatus according to the present invention may further include a guidance request transmission means for transmitting an electronic mail address and point information about a getting-off point and the destination to an information center, wherein the information center may transmit guidance information on a route from the getting-off point to the destination to a portable information device of the user.

This capability of the navigation apparatus makes it possible to transmit detailed information about a route from the getting-off point to the final destination facility from the information center storing a huge amount of information to the portable information device of the user.

The navigation apparatus according to the present invention may further include means for registering an electronic mail address to which to transmit route guidance information. In this navigation apparatus, when it is needed to acquire guidance information from the information center, it is possible to easily specify an electronic mail address to which to transmit guidance information simply by reading the registered address data without having to perform a troublesome operation of inputting the mail address.

In the navigation apparatus according to the present invention, the guidance information on the route from the getting-off point to the destination may include guidance information on the use of a train. This makes it possible for the user to reach the destination via a quicker route using a train in accordance with the guidance information without encountering a problem, even if the user uses the train for the first time.

DESCRIPTION OF THE PREFERRED EMBODIMENTS

Figure 1:
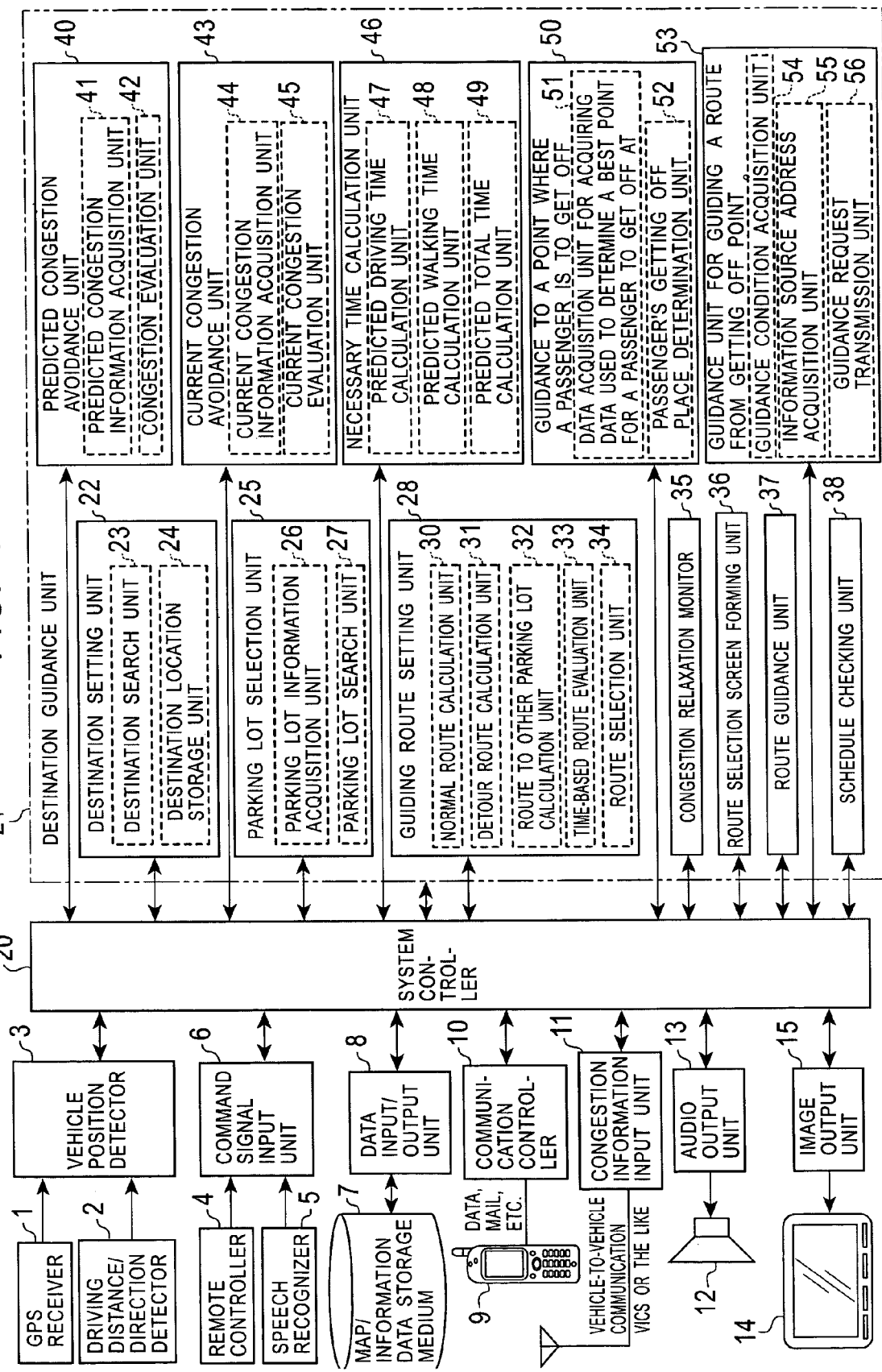
FIG. 1 is a block diagram illustrating functional blocks according to the present invention.

The present invention is described in further detail below with reference to preferred embodiments in conjunction with the accompanying drawings. FIG. 1 is a functional block diagram illustrating various functions and relationships among the blocks according to an embodiment of the present invention. Of those functional blocks shown in FIG. 1, a destination guidance unit 21 for guiding a vehicle to a destination features the present invention, and thus this functional block is shown in greater detail than other functional blocks. The destination guidance unit 21 operates in cooperation with other functional blocks to provide necessary functions, wherein the operation is performed by means of software under the control of a system controller 20. Respective functional blocks and respective sub functional blocks can be regarded as means for providing corresponding functions.

In the embodiment shown in FIG. 1, a vehicle position detector 3 is connected with the system controller 2. The vehicle position detector 3 detects the current position of a vehicle using position data received by a GPS receiver 1 and also using, as required, data indicating vehicle motion supplied by a running distance/direction detector using a vehicle speed sensor and an angle sensor. A command signal input unit 6 is used to receive a command signal issued by a user using a remote controller 4 or the like. The command signal input unit 6 also receives a voice command signal issued by a user via a voice recognition unit 5.

A map data input/output unit 8 acquires map data, facility information, and other necessary information from a ap/information data storage medium 7 such as a DVD-ROM, a CD-ROM, or a hard disk. In a case in which the data storage medium used is of a writable type such as a hard disk, data acquired from the outside or data processed by other functional blocks is stored on the data storage medium via the map data input/output unit 8 so that the stored data can be used when necessary.

In the example shown in FIG. 1, a communication controller 10 is connected to a portable telephone 9 whereby, for example, various kinds of guidance information, road information, and/or traffic information associated with a wide area are acquired from an information center via the Internet. Furthermore, using the portable telephone 9, it is possible to receive, from the information center, an electronic mail with an attached data file such as a map indicating a route or other necessary data. The portable telephone 9 can also be used to receive data indicating a URL of a particular site that provides map information.

An audio output unit 13 outputs various kinds of voice/sound data such as a voice guidance message via a speaker 12. On a monitor display 14, various kinds of information such as a map are displayed. A selection screen used by a user to make a selection is also displayed on the monitor display 14 as required.

The destination guidance unit 21, which provides a main function according to the present invention, includes various functional blocks for providing various functions depending upon a running state of a vehicle and/or in response to a request issued by a user. More specifically, in a destination facility setting unit 22 of the destination guidance unit 21, a destination facility search unit 23 searches for facilities that match conditions specified by a user via the command signal input unit 6 from data read from the map/information data storage medium 7 via the data input/output unit 8, and the destination facility search unit 23 displays detected facilities on the monitor display 14 via the image output unit 15. If the user decides to go to a particular department store displayed on the monitor screen 14 and the user specifies the department store as a destination, a destination facility location storage unit 24 stores location data indicating the location of the destination, such that the location data can be used for various purposes, as will be described later.

A parking lot selection unit 25 processes information associated with parking lots. For example, when a department store is the destination as in the present example, the parking lot selection unit 25 selects a parking lot that is most suitable for visiting the department store. To realize this function, a parking lot information acquisition unit 26 acquires information associated with a dedicated parking lot at the destination facility/building, parking lots for use by visitors to a destination facility/building, and/or parking lots close to the destination facility, from a map/information data storage medium 7 via a data input/output unit 8. A parking lot search unit 27 searches for suitable parking lots that meet various conditions, as will be described later.

When proper parking lots for use when visiting a particular facility are searched for, a prediction of congestion that will occur in a time frame when the user leaves a parking lot is made using information provided by a predicted congestion avoidance unit 40. If traffic congestion is predicted, it is also checked whether there is a better parking lot taking into account the predicted congestion.

For the above-descried purpose, a predicted congestion information acquisition unit 41 of the predicted congestion avoidance unit 40 acquires information about predicted congestion in an area close to the destination facility from the information center of the like via, for example, the portable telephone 9 or acquires predicted congestion information from another vehicle by means of vehicle-to-vehicle communication via a congestion information input unit 11.

On the basis of the predicted congestion information acquired in the above-described manner, a predicted congestion evaluation unit 42 predicts whether. congestion will occur along a route to be used when the user returns from the destination facility in a time frame when the user leaves the destination facility. If it is determined that congestion will occur in an area close to the destination facility or on the return route, the parking lot selection unit 25 searches for other parking lots taking into account the predicted congestion.

A current congestion avoidance unit 43 determines whether there is currently congestion along the route that the vehicle is currently running in accordance with route guidance, and determines whether congestion avoidance processing is needed. A current congestion information acquisition unit 44 acquires VICS information via the congestion information input unit 11 or acquires current congestion information from a vehicle running ahead by means of vehicle-to-vehicle communication. If required, data indicating whether the current average driving speed is lower than a predetermined value is also acquired.

On the basis of the information acquired in the above-described manner, and taking into account a predicted influence of the detected congestion on driving along the current route, a current congestion evaluation unit 45 determines whether to search for a detour route and/or whether to search for another parking lot other than the parking lot currently planned to be used, as will be described later.

A navigation route setting unit 28 selects a route from the current position to the destination and sets the selected route as the navigation route. In the navigation route setting unit 28, a normal navigation route calculation unit 30 has a navigation route calculation capability similar to that of the conventional navigation apparatus. More specifically, on the basis of the location of a destination facility that the user is going to visit and that is set via the destination facility setting unit 22 and on the basis of the location of a parking lot specified by the user via the parking lot selection unit 25, and furthermore on the basis of the current position data, the normal navigation route calculation unit 30 calculates possible routes along which to guide a vehicle from the current position to the destination, in accordance with data acquired from the map/information data storage medium 7 via the data input/output unit 8. On the basis of the calculation result, the navigation apparatus presents to a user a recommended route, a route including a high-priority expressway specified by the user to be used, a route including a low-priority route, a shortest route, and/or a quickest route.

In a case in which the current congestion avoidance unit 43 determines that the current route should be altered to deal with traffic congestion on the currently selected route, a detour route calculation unit 31 searches for a detour route to a currently targeted parking lot other than the current route, and the detour route calculation unit 31 presents both the current route and the detour route to the user to prompt the user to determine whether or not the detour route is to be selected.

When congestion on the route in an area near the destination is detected, a route to alternative parking lot calculation unit 32 searches for a route to an alternative parking lot other than the currently targeted parking lot, taking into account not only the driving time but also a walking time from the alternative parking location to the destination facility.

In a necessary time calculation unit 46, when it is assumed that another parking lot is used, a predicted driving time calculation unit 47 calculates the predicted driving time needed to drive to the parking lot, a predicted walking time calculation unit 48 calculates the predicted walking time needed to walk from the parking lot to the destination facility, and a predicted total time calculation unit 49 calculates the sum of the predicted driving time and the predicted walking time.

A time-based route evaluation unit 33 in the navigation guiding route setting unit 28 evaluates respective routes on the basis of necessary times calculated by the necessary time calculation unit 46 for each of the parking lots retrieved in the above step, and selects the most suitable routes to the new parking lots from detected parking lots. The time-based route evaluation unit 33 presents the selected routes to the user, in the order of suitability. If the user selects a route from the recommended routes, a route selection unit 34 sets the selected route as the new route along which to provide route guidance.

When the vehicle is traveling along the detour route determined by the detour route calculation unit 31 of the navigation guiding route setting unit 28, in response to determination by the current congestion avoidance unit 43 that congestion along the original route should be avoided, or when the vehicle is traveling along the route to the newly selected parking lot in accordance with the recommendation made by the route to alternative parking lot calculation unit 32, a congestion relaxation monitor 35 monitors whether congestion detected along the route originally selected as the most suitable route has disappeared. If the congestion relaxation monitor 35 detects that congestion has disappeared, the navigation route setting unit 28 determines whether to return to the original route from the current running position.

When the current congestion avoidance unit 43 detects congestion to be avoided along the current route, if a passenger's getting-off point guidance unit 50 determines that a passenger can travel faster on foot to the destination facility such as the department store than by going further by vehicle along a detour route to a newly selected parking lot, the passenger's getting-off point guidance unit 50 provides a message to inform the user of such. More specifically, the necessary time calculation unit 46 calculates the time, including the walking time, needed to get to the final destination facility from the current position, and a data acquisition unit for acquiring data used to determine a best getting-off point for a passenger 51 acquires data indicating the necessary time calculated by the necessary time calculation unit 46. On the basis of the acquired data, a passenger's getting-off point determination unit 52 detects a best point for the passenger to get off the vehicle.

Also in a case in which a vehicle is traveling along a route to a particular station to which to deliver the passenger to, if congestion in an area near the station is detected, the passenger's getting-off point guidance unit 50 performs detection of a best point for the passenger to get off the vehicle and walk. On the other hand, in a case in which a user travels by vehicle to a station to pick up person, if traffic congestion occurs in an area near the station, the passenger's getting-off point guidance unit 50 can detect a better place other than the station to pick up the person. That is, the passenger's getting-off point guidance unit 50 checks whether it is possible to pick up the person much earlier if the vehicle waits at a place other than the station and if the person walks to that place.

When it is necessary that a user should take a person via vehicle by a particular time, for example, to a school at which the person will take an important examination such as an entrance examination, if traffic congestion occurs in the middle of the route to the school, there is a possibility that the person can arrive at the school earlier if the person gets off the vehicle at a certain station and gets on a train to another station near the school. If traffic congestion occurs in such a situation, a train schedule table is acquired using a portable telephone or the like, and the passenger's getting-off point determination unit 52 examines various possible routes including train routes and walking routes, which allow the person to arrive at the school before the time limit, and detects a best point. The information necessary to detect such a best point may be produced by the information center or the like on the basis of various given conditions, and may be transmitted from the information center.

A route selection screen forming unit 36 forms a selection screen that allows a user to select a route from candidates presented via the above-described calculations performed by the functional units taking into account various conditions such as parking lots, routes, and getting-off points. If a route is selected, the route guidance unit 37 guides the vehicle to the destination along the selected route in a similar manner as is performed by the conventional navigation apparatus.

A schedule checking unit 38 periodically checks a given schedule to check whether the current driving state satisfies the schedule. For example, when a user has to arrive at a particular destination by a particular time to attend a meeting, or when it is necessary to deliver a person to a particular destination by a particular time so that the person can take an examination or the like as in the above-described example, the schedule checking unit 38 checks whether the current driving state permits the user or the person to arrive at the destination by the scheduled time. When the schedule checking unit 38 determines that arriving at the destination by the scheduled time is difficult or when the schedule checking unit 38 determines the current route should be altered to arrive at the destination by the scheduled time, the schedule checking unit 38 provides a message to inform the user of the above situation.

A guidance unit 53 for guiding the route from the getting-off point provides route guidance from a getting-off point. For example, when a user walks to a final destination facility such as a department store from a parking lot, or when a passenger gets off a vehicle before arriving at a final destination because of encountering traffic congestion and walks to a final destination facility after he/she gets off the vehicle, the guidance unit 53 provides guidance on a walking route to the final destination facility. Also in a case in which a passenger gets off a vehicle near a station and gets on a train to a final destination, guidance on a train route from that station to a station near the final destination and a walking route from a station to the final destination is provided.

For the above purpose, the guidance unit 53 includes a guidance condition acquisition unit 54 for acquiring basic conditions under which to provide guidance, such as a point at which a user gets off a vehicle, a location of a destination facility, and/or a start time of a meeting or a test. A mail address acquisition unit 55 acquires an address at which to receive guidance data. More specifically, when guidance data is acquired via an electronic mail, if a user inputs a mail address, the mail address acquisition unit 55 captures the input address, while the mail address acquisition unit 55 acquires an address if the address is already registered in the navigation apparatus.

A guidance request transmission unit 56 transmits data indicating the guidance conditions acquired by the guidance condition acquisition unit 54 and the mail address acquired by the mail address acquisition unit 55 to the information center or the like via the portable telephone 9, to request that the information center transmit guidance information to the mail address. Note that a technique of transmitting guidance information along a walking route to a final destination from a point at which a user gets off a vehicle to a portable telephone by means of an electronic mail has already been filed as a patent application (Japanese Patent Application No. 2002-9307) and is in practical use.

Figure 2:
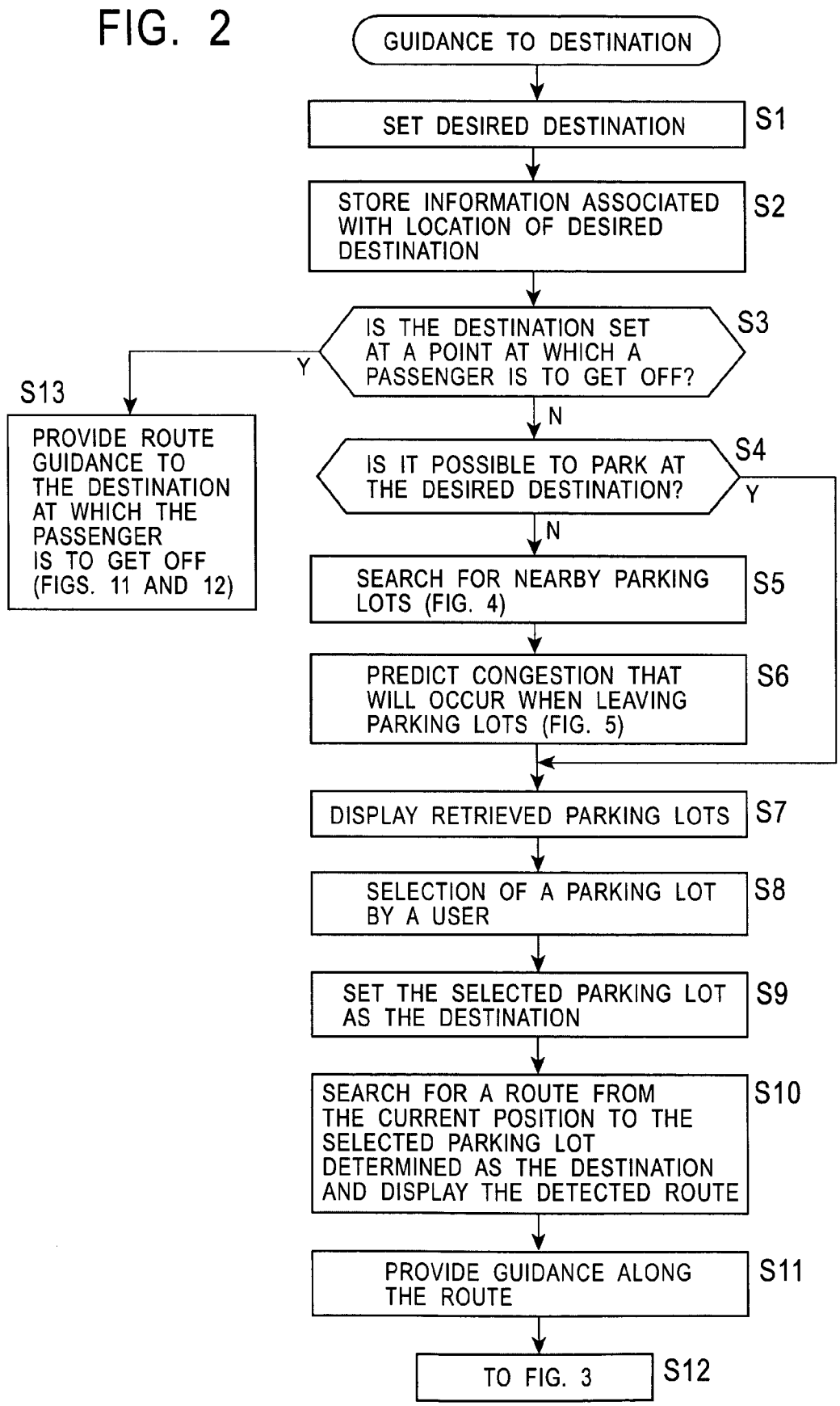
FIG. 2 is a flow chart illustrating a part of a basic operation in route guidance to a destination according to the present invention.
Figure 3:
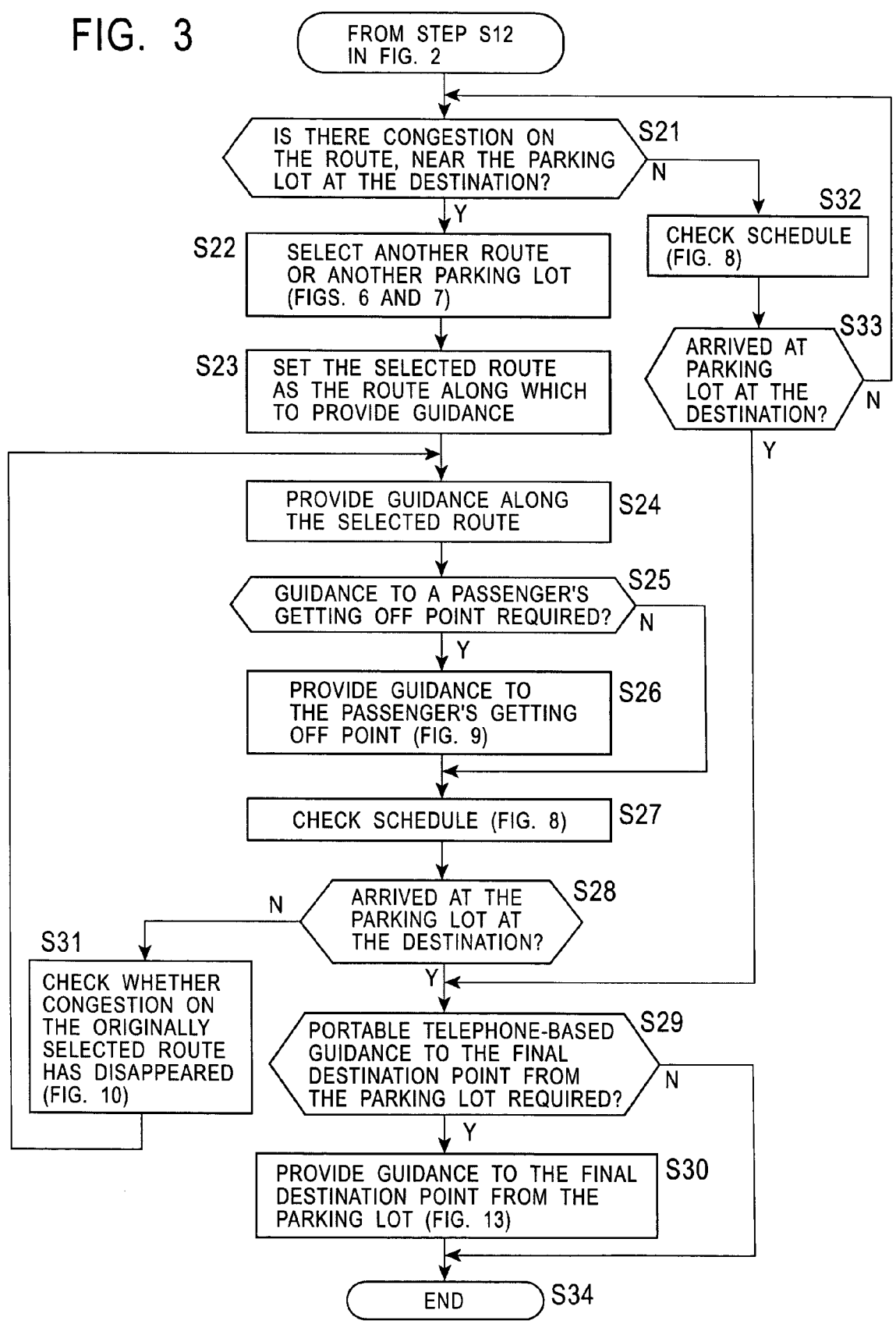
FIG. 3 is a flow chart illustrating another part of the basic operation in route guidance to a destination according to the present invention.

In the navigation apparatus mainly formed of the above-described functional blocks, guidance to a destination is performed, for example, according to operation flows shown in FIGS. 2 to 13. The operation flows are described below with reference to the block diagram shown in FIG. 1 for specific examples shown in FIGS. 14 to 19. FIGS. 2 and 3 show a basic operation. First, as shown in FIG. 2, a destination facility to which to visit is set (step S1). The setting of the destination facility is performed in accordance with data directly input by a user via the destination facility setting unit 22 shown in FIG. 1, or performed such that the destination facility search unit 23 searches for facilities on the basis of addresses or telephone numbers, and the user selects a proper one from the facilities detected by the destination facility search unit 23. For example, in the case in which a user goes to a department store by car, the final destination is not any parking lot but the department store, and thus, the location of the department store is set as the destination facility.

The location information of the destination facility is then stored (step S2). This is performed by the destination facility location storage unit 24 of the destination facility setting unit 22 shown in FIG. 1. For example, a RAM or the like is used as the destination facility location storage unit 24, and storing is performed under the control of the system controller. Thereafter, it is determined whether a point specified as the destination is a point at which a passenger is to get off the vehicle (step S3). In the present invention, guidance to the destination is provided in one of two modes. In one mode, route guidance is provided when a parking lot is used. For example, when a user travels by vehicle to a destination facility such as a department store, a best parking lot is selected taking into account not only a driving time but also a walking time from the parking lot to the final destination facility depending upon whether there is traffic congestion. In the other mode, route guidance is provided when parking is not necessary. For example, when a user takes a passenger by vehicle to a particular destination such as a station, a best point for the person to get off the vehicle is selected taking into account the time needed for the person to walk from the get-off point to the final destination such as the station, depending upon whether there is traffic congestion. Thus, in step S3, it is determined in which mode to provide route guidance. If it is determined in step S3 that a getting-off point to which to take the passenger by vehicle is set as the destination and thus it is not necessary to take into account parking, then the process jumps to step S13 in which route guidance to the getting-off point is performed as described in detail later with reference to FIGS. 11 and 12.

The determination as to the operational mode is made as follows. For example, in the vehicle navigation apparatus according to the present invention, when a selection is made as to whether to use the function of providing guidance taking into account walking, a selection screen is displayed for use by a user to select whether the specified destination is a point to which to take a passenger, and the operational mode is determined in accordance with the selection made by the user via the selection screen.

If it is determined in step S3 that the destination is not a point to which to take a passenger by vehicle, that is, if it is determined that processing should be performed not to provide route guidance to a point to which to take the passenger by vehicle without having to take into account parking, but to provide route guidance taking into account a parking lot, then the process proceeds to step S4. In step S4, it is determined whether a parking lot at the destination facility is available. In this determination step, when the destination facility is, for example, a department store, if a parking lot such as an underground parking lot of that department store is detected to be available via a process of searching for parking lots, the process proceeds to step S7. However, if it determined that the parking lot at the destination facility is not currently available, a plurality of other parking lots for dedicated or semi-dedicated use by visitors to the department store or nearby general parking lots are searched for (step S5). In this searching step, a proper parking lot is selected taking into account the time needed to walk to the destination facility from the parking lot, as will be described later in detail with reference to a flow chart shown in FIG. 4.

In this step, it is desirable to retrieve as many parking lots near the destination facility as possible, so that the user can select a best parking lot from numerous parking lots and also so that as many retrieved parking lots as possible are evaluated from the point of view of suitability in a predicted congested situation, in step S6 described later, to occur when the vehicle leaves the parking lot and most suitable parking lots selected taking into account necessary walking time and/or other factors are displayed in step S7.

In a case in which it is predicted that traffic congestion will occur in an area near the retrieved parking lots after leaving the parking lots, a selection of a parking lot is performed taking into account walking that can reduce the total time in a congested situation (step S6). This step will be described in further detail later with reference to FIG. 5. In this step, as described later, on the basis of the result of the determination made by the predicted congestion avoidance unit 40 shown in FIG. 1, parking lots for dedicated or semi-dedicated use by visitors and parking lots for general users detected in step S5 by the parking lot selection unit 25 are re-evaluated.

The parking lots selected in the above-described manner are displayed together with associated information so that the user can make a final selection on the basis of the displayed information (step S7). In response, if the user selects a suitable parking lot from the presented candidates (step S8), the parking lot selected herein is set as the destination to which to guide the vehicle (step S9). A selection screen on which to display the above-described information is formed by the route selection screen forming unit 36 shown in FIG. 1.

Thereafter, as with the conventional navigation apparatus, a route to the parking lot specified as the destination is searched for, and the resultant route is displayed on the monitor display (step S10). More specifically, the normal navigation route calculation unit 30 of the navigation route setting unit 28 searches for the route, and the route selection screen forming unit 36 displays the resultant route on the monitor display. Herein, the searching for routes and the determination of the most suitable route are performed, as in the conventional navigation apparatus, such that a plurality of possible routes from the starting point to the destination are searched for using map information taking into account distances, times, fees, etc., and detected routes are displayed. In response, the user selects a most suitable route from the routes displayed, or a most suitable route is automatically selected and set as a route along which to guide the vehicle. In the case in which the user selects a route, as with the conventional navigation apparatus, the user inputs a selection signal via the command signal input unit 6, and the route selection unit 34 sets the route specified by the user as the route along which to guide the vehicle.

Thereafter, as with the conventional navigation apparatus, route guidance is provided along the route determined in the above-described manner (step S11). More specifically, the route guidance is performed by the route guidance unit 37, as with the conventional navigation apparatus, such that the route along which to guide the vehicle is displayed on a map image, by a bold line with a color different from the color of the other roads. When the vehicle has come to a point within a predetermined range from an intersection at which to make a right or left turn according to the route, an intersection image is displayed in an enlarged fashion, and an arrow indicating the direction of the turn is displayed, or voice information is provided to indicate the direction of the turn. Route guidance is performed in the above-described manner until the user reaches the destination. In the process of guiding the vehicle to the destination, steps following S12 are shown in the form of a flow chart in FIG. 3.

As shown in FIG. 3, in the first step following step S12 shown in FIG. 2, it is determined whether there is traffic congestion along the route in an area near the currently targeted parking lot (step S21). This determination is made in a similar manner to the determination made by the conventional navigation apparatus in response to detection of traffic congestion along a navigation route except that traffic congestion in an area near a parking lot to which the vehicle is traveling is detected.

In this congestion detection process, the current congestion avoidance unit 43 shown in FIG. 1 determines whether the current route should be altered to deal with the detected traffic congestion. More specifically, in the current congestion avoidance unit 43, the current congestion evaluation unit 45 determines whether it is necessary to alter the current route to deal with the traffic congestion on the basis of information supplied by the current congestion information acquisition unit 44 and indicates whether there is traffic congestion in an area near the currently targeted parking lot, taking into account the degree of influence of the traffic congestion on traveling along the navigation route.

If it is determined in step S21 that there is traffic congestion along the route in an area near the currently targeted parking lot, and if the current route should be altered to deal with the traffic congestion, searching and selection of an alternative route or an alternative parking lot for use in a situation in which traffic congestion in an area near the originally targeted parking lot is detected is performed.

Figure 8:
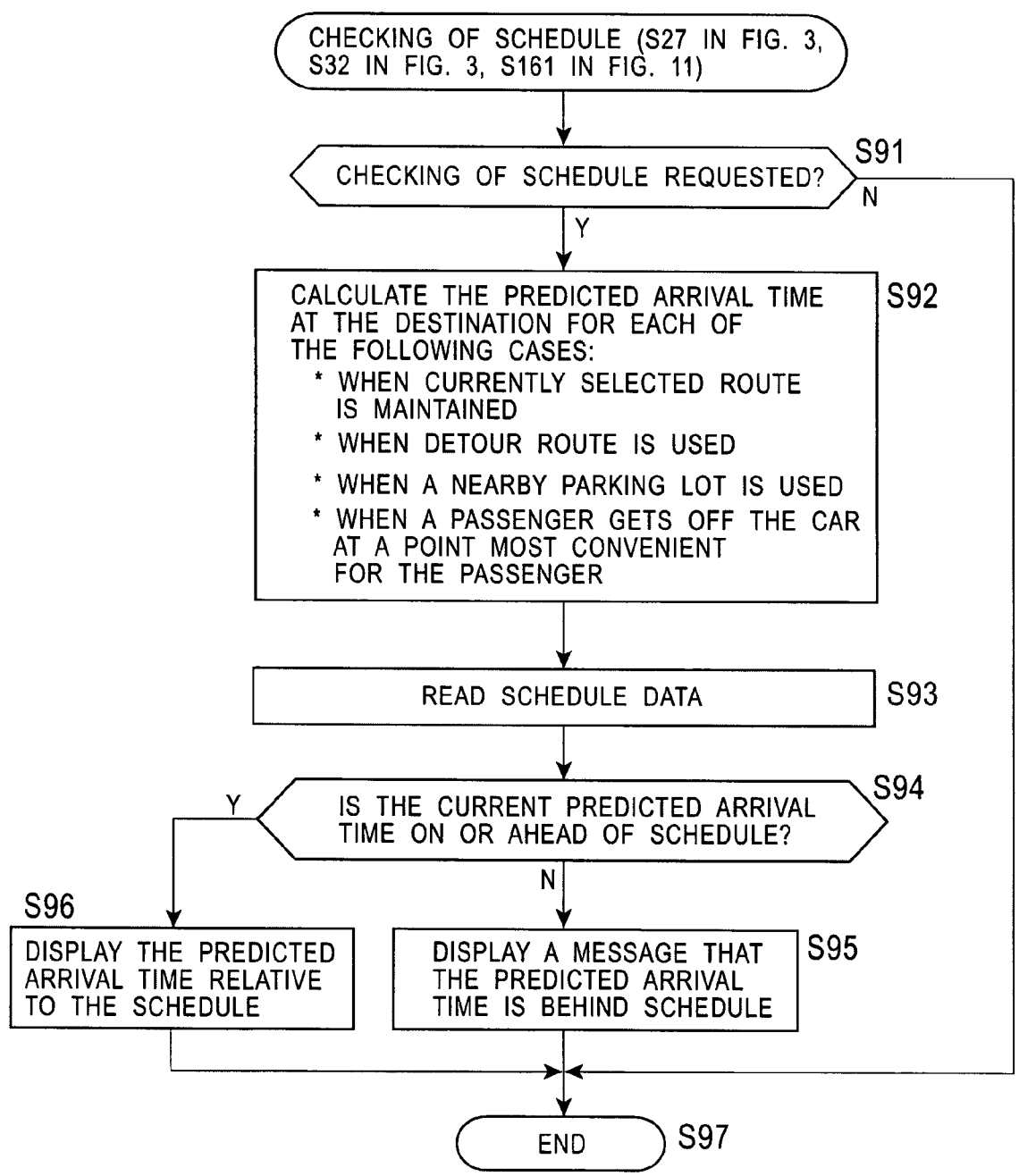
FIG. 8 is a flow chart illustrating a schedule checking process according to the present invention.

On the other hand, if it is determined in step S21 that there is no traffic congestion along the navigation route in the area near the currently targeted parking lot, or if it is determined that it is not necessary to take a particular action to deal with traffic congestion, a schedule is checked as will be described later in detail with reference to FIG. 8 (step S32). In the next step, it is determined whether the vehicle has arrived at the parking lot specified as the destination (step S33). If the vehicle has not yet arrived at the destination, the process returns to step S21, and the determination as to whether there is traffic congestion along the navigation route in the area near the currently targeted parking lot is performed again. On the other hand, if it is determined in step S33 that the vehicle has arrived at the targeted parking lot, the process proceeds to step S29, in which walking route guidance from the parking lot is provided as will be described later.

In the case in which it is determined in step S21 that there is traffic congestion along the navigation route in the area near the parking lot and thus, in step S22, another route or another parking lot is selected in response to detection of traffic congestion, the newly selected route is set as the navigation route (step S23), and route guidance is provided along the newly selected navigation route (step S24).

When the vehicle encounters unavoidable traffic congestion on the way to a destination facility such as a department store, there is a possibility that if a passenger leaves the vehicle and walks to the department store, the passenger can arrive at the department store earlier and can spend time more efficiently than by staying in the vehicle stuck in the traffic congestion. Thus, in such a situation, it is determined whether to perform the process of providing guidance information as to the getting-off point for the passenger (step S25).

The setting as to whether to perform the above-described process in such a situation may be made in advance as a default. When the vehicle is brought into such a situation, a selection screen may be displayed to allow the user to select whether to perform the process. The process of presenting information as to whether a passenger should get off the vehicle is performed by the passenger's getting-off point guidance unit 50 shown in FIG. 1.

In the case in which it is determined in step S25 that presenting of information as to the getting-off point for the passenger is set not to be performed as default or is specified by the user not to be performed, the process jumps to step S27. On the other hand, if it is determined in step S25 that presenting of information as to the getting-off point for the passenger should be performed, the process of presenting of information as to the getting-off point for the passenger is performed (step S26). The details of this process will be described later in detail with reference to FIG. 9. In the next step S27, the schedule checking process, the details of which are shown in FIG. 8, is performed in a similar manner as in step S32 described above.

In step S28, it is determined whether the vehicle has arrived at the targeted parking lot. If the vehicle has not yet arrived at the parking lot, the process proceeds to step S31. When the vehicle is traveling toward an alternative parking lot selected in response to the detection of traffic congestion along the original navigation route in an area close to the original parking lot, if the traffic congestion along the route to the original parking lot disappears, it is desirable to return to the route originally selected as the best route. Thus, checking as to whether the traffic congestion along the original route has disappeared is performed as will be described in detail later with reference to FIG. 10. Subsequently, the process returns to step S24 to provide route guidance along the currently selected navigation route. Thereafter, the process is repeated in above-described manner.

In a case in which it is determined in step S28 that the vehicle has arrived at the targeted parking lot, then it is further determined whether to transmit walking guidance from the parking lot to the final destination facility to a portable information device such as a portable telephone (step S29). If it is determined that walking guidance information is to be transmitted, walking guidance from the parking lot to the destination facility is provided as described in detail later with reference to FIG. 13. Thus, the process of guiding the vehicle to the destination shown in FIGS. 2 and 3 is completed (step S34).

The general operation of providing route guidance to a destination has been described above. Now, the details of the operation are described below. In the process, in step S5 shown in FIG. 2, of searching for parking lots for dedicated or semi-dedicated use by visitors or nearby parking lots for use by general persons, as shown in the flow chart of FIG. 4, parking lots for dedicated or semi-dedicated use by visitors or nearby parking lots for use by general persons are first searched for to detect a plurality of arbitrary parking lots (step S41). Thereafter, information about those detected parking lots is acquired (step S42). More specifically, information indicating whether detected parking lots are currently available or information indicating the number of vacant spaces is acquired from the information center, the VICS or the like by using a portable telephone (Step S43).

On the basis of the information acquired in the above described manner, parking lots having vacant spaces are selected from the detected parking lots (step S43). However, in a case in which the destination is far from the current position of the vehicle and thus it takes a long time to get there, there is a possibility that a great change occurs in the state of parking lots before the arrival. In such a case, this step of selecting parking lots having vacant spaces may be skipped.

Thereafter, in the present embodiment, the necessary time is calculated for each of the selected parking lots. More specifically, the predicted driving time (Bt1) needed to drive to each parking lot from the current position is calculated (step S44), and the predicted walking time (Ct1) needed to walk from each parking lot to the final destination is calculated (step S45). Furthermore, the total time (At1=Bt1+Ct1) needed to get to the final destination facility from the current position is calculated (step S46). The calculations of those values are performed in the necessary time calculation unit 46 shown in FIG. 1 by the predicted driving time calculation unit 47, the predicted walking time calculation unit 48, and the predicted total time calculation unit 49, respectively. A predetermined number of parking lots having the least total times are then selected in the order of increasing total time (step S47), and the process is ended (step S48).

Figure 4:
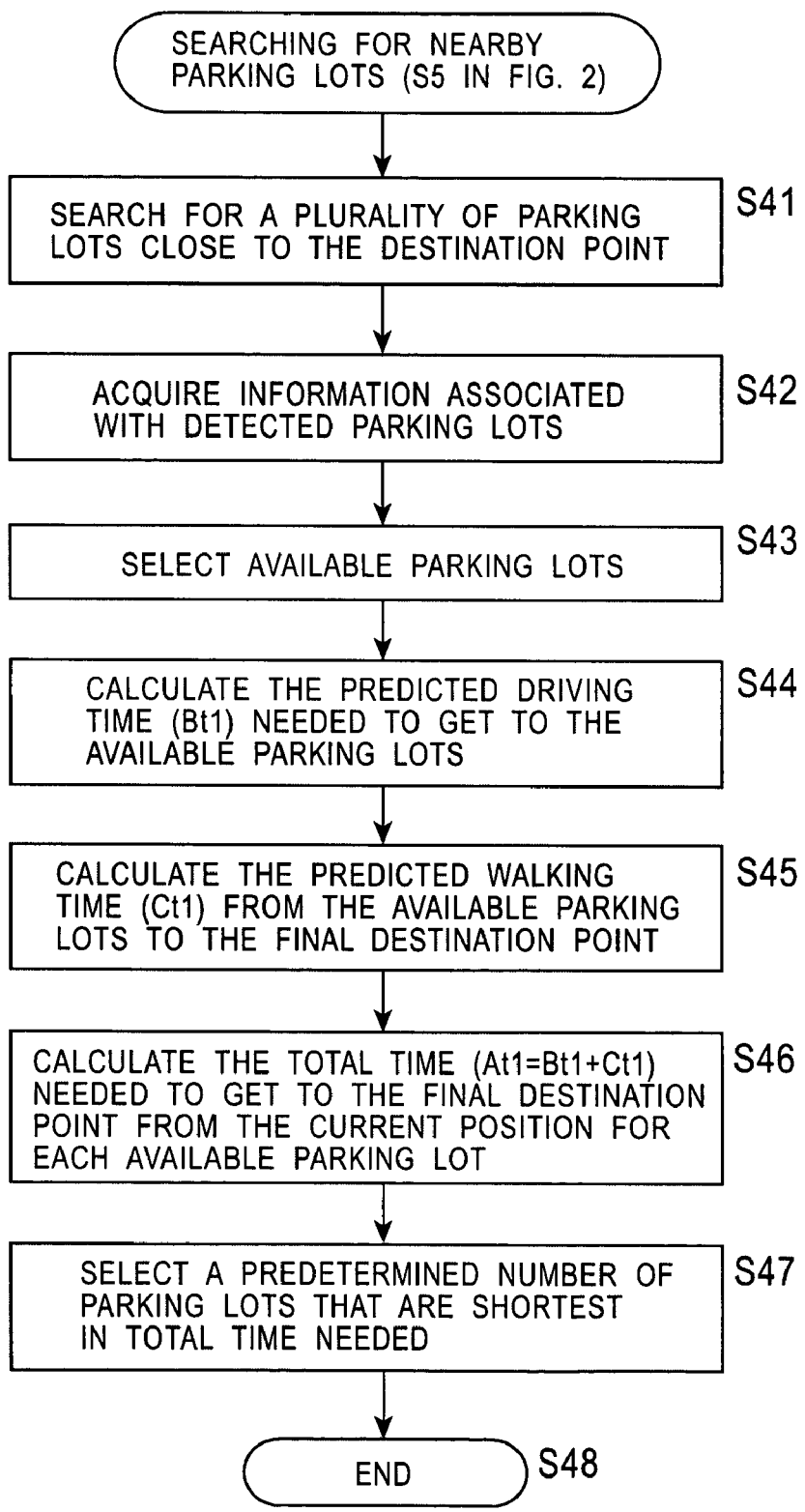
FIG. 4 is a flow chart illustrating a process of searching for parking lots for dedicated or semi-dedicated use by visitors or parking lots for use by general visitors in a nearby area, according to the present invention.
Figure 14A:
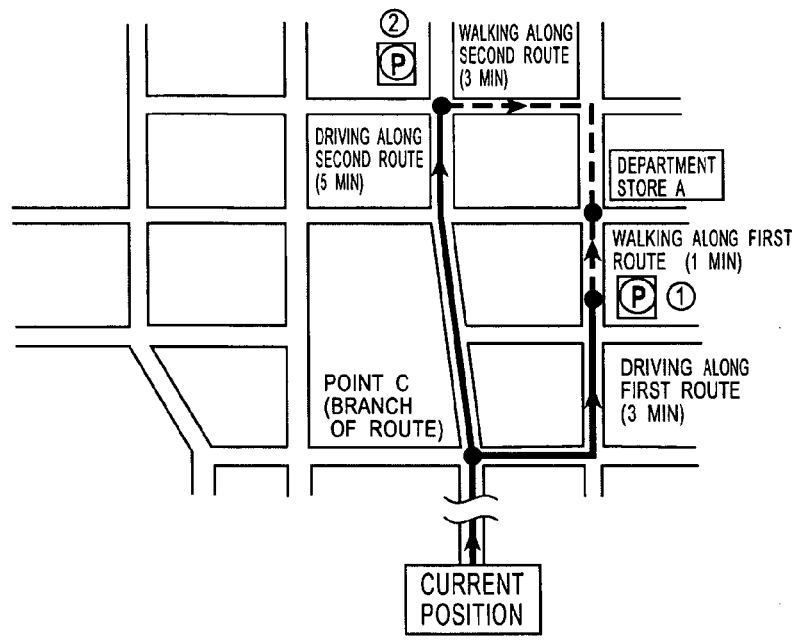
FIG. 14A is a diagram showing a manner in which a parking lot is selected without taking into account traffic congestion that may occur after a vehicle leaves the parking lot.

In the conventional navigation apparatus, for example, when a user travels by vehicle to a department store A specified as a destination facility from a current position as shown in FIG. 14A, if parking lots P1 and P2 closest to the department store A are detected in step S41 in FIG. 4, the locations of those detected parking lots are displayed on the screen together with information about parking fees, and the user selects a parking lot from those displayed on the screen taking into account all factors including the distance between the parking lots to the department store A and the parking fees. For example, when the parking fees of the parking lots P1 and P2 are equal, the parking lot P1 closer to the department store A is selected.

However, if the parking fee of the parking lot P2 is lower, the user may not decide at once which parking lot should be selected. To facilitate the decision to select a cheaper parking lot although it is slightly farther than the other parking lot, it is necessary to acquire information indicating whether the time needed to walk from the parking lot P2 to the department store A is much greater or only slightly greater than the time needed to walk from the parking lot P1. In the present invention, in view of the above, not only the total time but also the predicted walking time from each parking lot to the department store A can be displayed as required. In the specific example shown in FIG. 14A, the walking time from the parking lot P1 to the department store A along a first walking route represented by a dotted line in FIG. 14A is 1 min, and the walking time from the parking lot P2 to the department store A along a second walking route represented by another dotted line in FIG. 14A is 3 min. Thus, the user can decide which parking lot should be selected, taking into account the walking time in addition to other factors, such as the parking fee.

In the determination of the parking lot taking into account the walking time, it is also desirable to take into account the driving time from the current position to each parking lot. In this regard, the navigation apparatus according to the present invention provides information indicating the predicted driving time from the current position to each parking lot calculated by the predicted driving time calculation unit 47. In addition to the driving time from the current position to each parking lot, driving times needed from a branch point (denoted by "POINT C" in FIG. 14A) on the route to the respective parking lots may also be calculated and displayed. In the specific example shown in FIG. 14A, the driving time from the branch point C to the parking lot P1 along a route (denoted by "DRIVING ALONG FIRST ROUTE (3 MIN)") shown in FIG. 14A is 3 min, while the driving time from the branch point C to the parking lot P2 along a route (denoted by "DRIVING ALONG SECOND ROUTE (5 MIN)") shown in FIG. 14A is 5 min.

Figure 5:
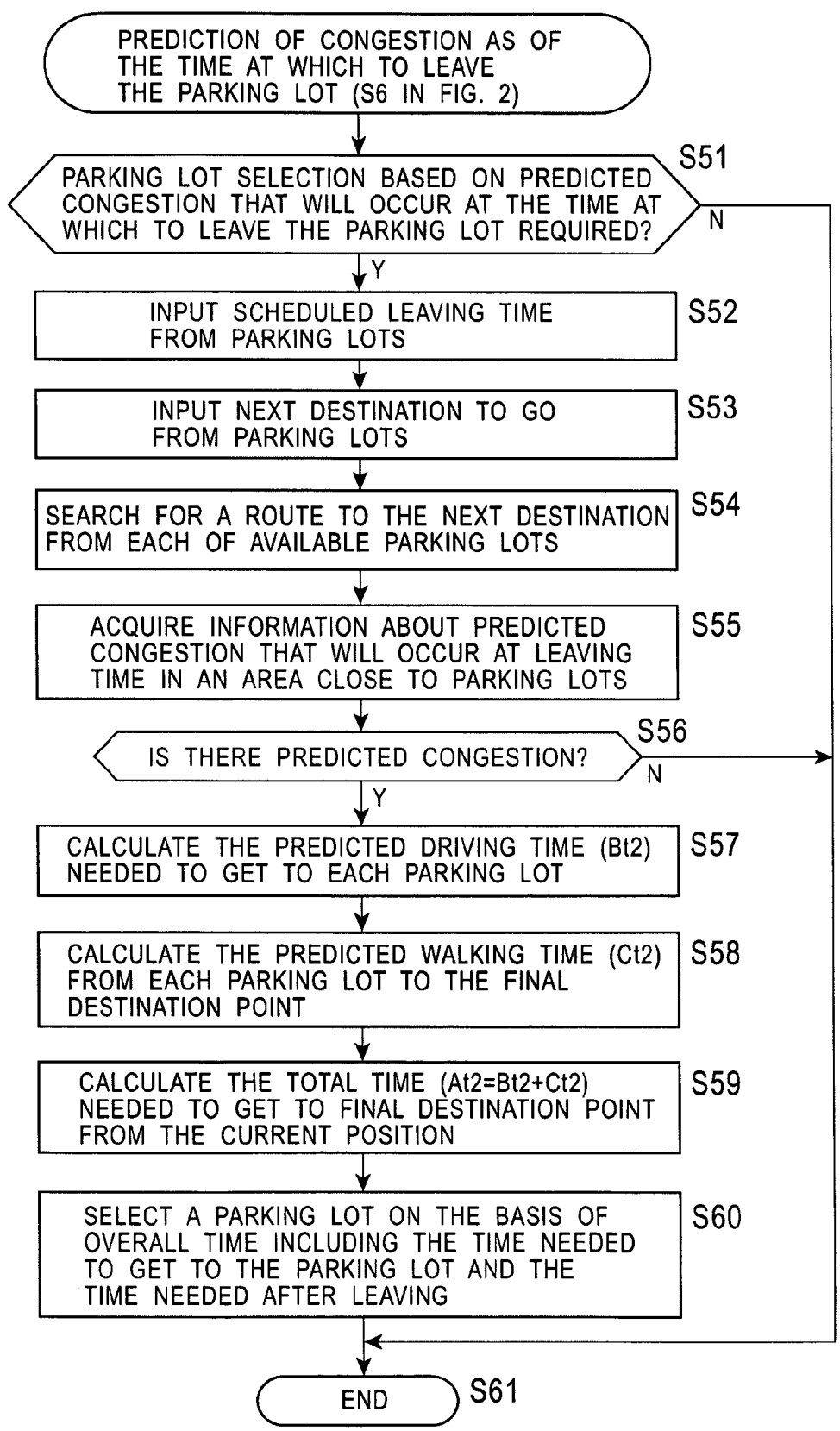
FIG. 5 is a flow chart illustrating a process of predicting traffic congestion that will occur at a time at which to leave a parking lot, according to the present invention.

The process, in step S6 in FIG. 2, may predict traffic congestion that may occur at the time of departing the parking lot in response to the user selecting (in step S51) to perform this process, as shown in FIG. 5. That is, this process of selecting a parking lot on the basis of information on predicted traffic congestion that may occur at a time of departing the parking lot is optional in the route guidance to the destination according to the present invention. In the initial setting of the navigation apparatus, the user may specify that this process should be performed. Alternatively, the user may specify whether to perform this optional process according to information displayed on the screen each time the navigation apparatus is used. If it is determined affirmatively in step S51 as to whether to select a parking lot on the basis of information on predicted traffic congestion that may occur at a time of departing the parking lot, the process proceeds to step S52. However, if the determination in step S51 is negative, the process proceeds to step S61 at which the process returns to step S7 in FIG. 2.

In the case in which the user selects, in step S51, to perform the parking lot selection on the basis of information on predicted traffic congestion that may occur at a time of departing the parking lot, the user inputs a time at which to leave the parking lot in accordance with guidance information displayed on the screen. More specifically, in the present embodiment, the user inputs a time at which to leave the parking lot (step S52), and further inputs a next destination to which to proceed to from the parking lot (step S53). In the selection of a parking lot taking into predicted traffic congestion that may occur at a time of departing the parking lot, when traffic congestion is predicted in an area close to the parking lot, if the traffic congestion is not along the route from the parking lot to the next destination, it is not necessary to take into account the traffic congestion. Therefore, in order to correctly determine whether traffic congestion should be taken into account, it is necessary to input the next destination to which to go to after leaving the parking lot. However, it is not necessary to input the next destination in the case in which, after leaving the parking lot, the route to be traveled is along the same route as that to the parking log. In this case, the user may select "return along the same route".

Thereafter, searching for a route from the parking lot to a next destination is performed (step S54). In this specific example, a plurality of parking lots for dedicated or semi-dedicated use by visitors or nearby parking lots for general use have been detected in step S5 in FIG. 2. In order to select a suitable parking lot from those detected in step S5, a plurality of possible routes from each of those detected parking lots to the next destination are examined in a similar manner as is performed in the normal process of searching for navigation routes.

Thereafter, information is acquired about predicted traffic congestion that may occur in an area near the respective parking lots at a planned departure time from the parking lot (step S55). The predicted traffic congestion information may be acquired via the Internet, for example, from an information center operated by a navigation apparatus manufacturer or a car manufacturer or from a traffic information center. The predicted congestion information may be acquired for areas near respective specific parking lots or may be acquired for a rather wide area centered at the destination facility such as a department store because parking lots to be used must be located in such an area. In the latter case, the area may be specified on the basis of the location data of the destination facility.

A determination is then made as to whether the traffic congestion information acquired in the above-described manner indicates that traffic congestion will occur along each detected route from each parking lot to the next destination at the planned start time from the parking lot (step S56). If it is determined that no traffic congestion is predicted, the process proceeds to step S61 and the process returns to step S7 in FIG. 2. In step S7, the parking lots detected in step S5 in FIG. 2 are displayed.

On the other hand, if it is determined in step S56 that traffic congestion is predicted to occur, the predicted driving time (Bt2) needed to get to each parking lot is calculated (step S57). The predicted walking time (Ct2) needed to get to the destination facility from each parking lot is then calculated (step S58). Thereafter, the total predicted time (At2=Bt2+Ct2) needed to get to the destination facility from the current position is determined by calculating the sum of the predicted driving time and the predicted walking time (step S59). The calculations of those values are performed in the necessary time calculation unit 46 shown in FIG. 1 by the predicted driving time calculation unit 47, the predicted walking time calculation unit 48, and the predicted total time calculation unit 49, respectively.

On the basis of data obtained as a result of the above calculation, a parking lot is selected which is suitable in a situation in which traffic congestion is predicted to occur along the route from the parking lot to the next destination at the planned start time from the parking lot. Thereafter, in the present embodiment, the time needed to get to each parking lot calculated in the process described above with reference to the flow chart shown in FIG. 4, and the time needed to travel to the next destination calculated taking into account the predicted congestion are directly displayed to inform the user of those time values, or the sum of those values is displayed so that the user can easily make a decision on the basis of the total time (step S60). Thereafter, the process is ended (step S61).

Figure 14B:
FIG. 14B is a diagram showing a manner in which a parking lot is selected taking into account traffic congestion predicted to occur after a vehicle leaves the parking lot.

For example, when parking lots P1 and P2 are detected, in step S5 in FIG. 2, in an area close to the department store A specified as the destination facility as shown in FIG. 14A, if traffic congestion such as that shown in FIG. 14B is predicted to occur at the time at which to depart for the next destination from the parking lot, then the time needed to travel to a point B specified as the next destination from each parking lot is calculated taking into account the predicted traffic congestion. If the calculation indicates, for example, that in the case in which the parking lot P1 is used, the walking time from the department store A to the parking lot P1 is 1 min, and the driving time from the parking lot P1 to a point D at which the route joins with a route from the parking lot P2 is 15 min, while in the case in which the parking lot P2 is used, the walking time from the department store A to the parking lot P2 is 3 min and the driving time from the parking lot P2 to the jointing point D is 6 min, then it is obvious that the parking lot P2 is more advantageous from the viewpoint of the total time.

Although the parking lot P1 is more advantageous than the parking lot P2, as shown in FIG. 14A, from the point of view of the driving time needed to get to the parking lot from the current position and the walking time from the parking lot to the department store A, the parking lot P2 is more advantageous in terms of the time needed when leaving the parking lot. Via the process performed in step S5 shown in FIG. 2 the details of which are shown in FIG. 4 and via the process in step S6 shown in FIG. 2 the details of which are shown in FIG. 5, the user can obtain various kinds of information used to select a proper parking lot. As required, data comparatively indicating the total time needed when selecting each parking lot is obtained in step S60 for use by the user to make a decision from an overall viewpoint. The obtained information is displayed in step S7 shown in FIG. 2 so that the user can select a proper parking lot on the basis of the displayed information.

Figure 6:
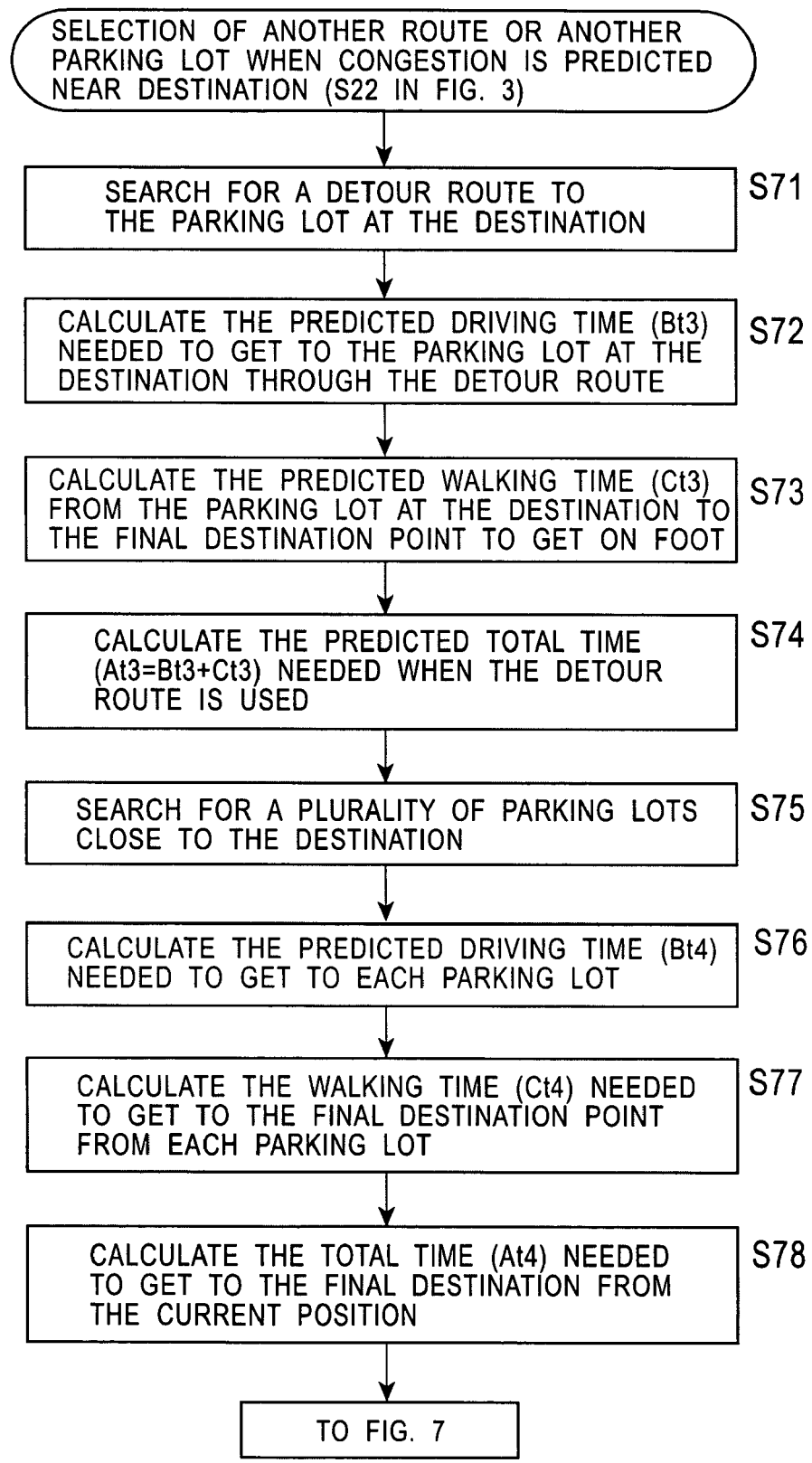
FIG. 6 is a flow chart showing a part of a process of searching for alternative parking lots and routes thereto in a situation in which traffic congestion in an area near an originally targeted parking lot is detected.
Figure 7:
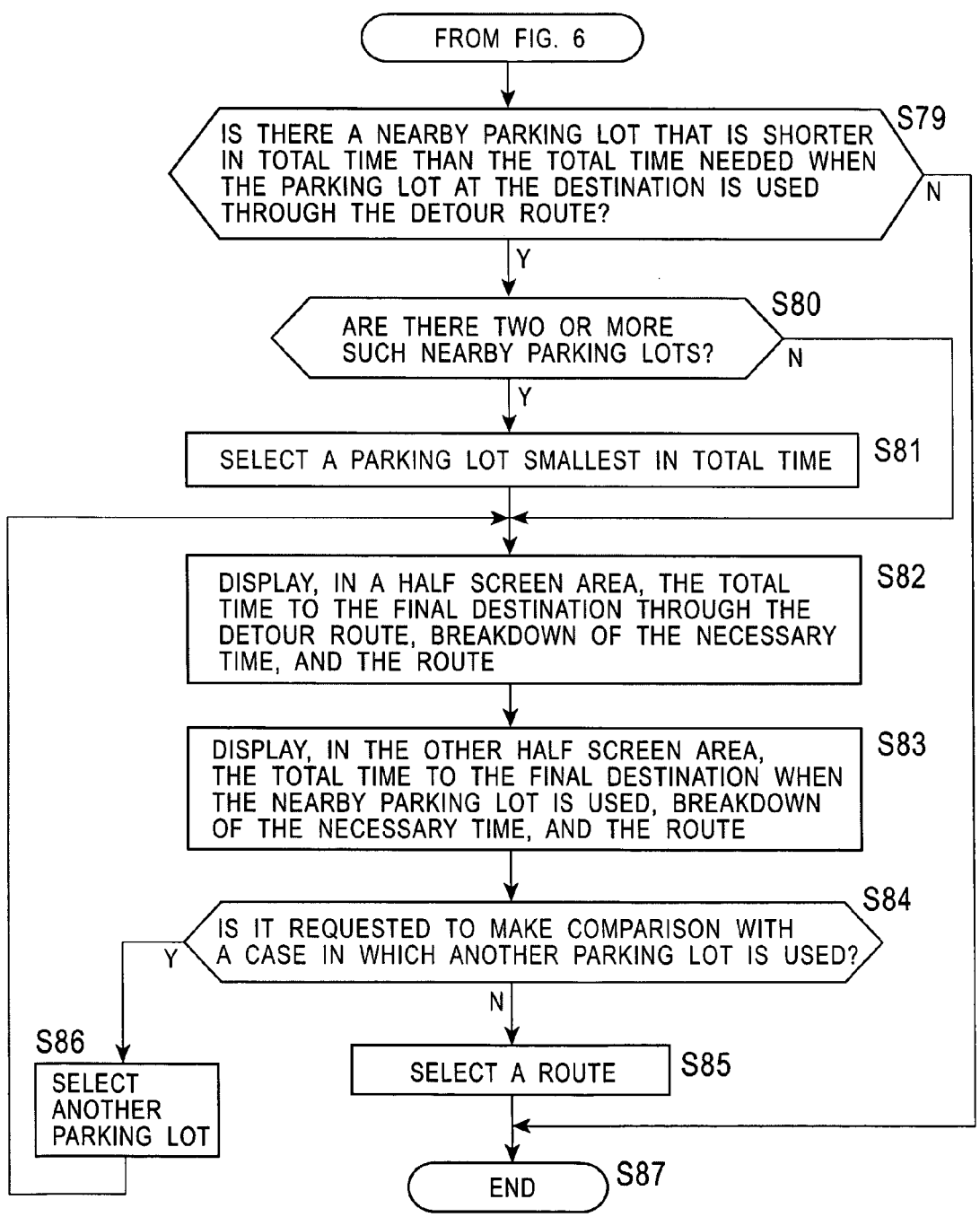
FIG. 7 is a flow chart showing the remaining part of the process searching for alternative parking lots and routes thereto in the situation in which traffic congestion in the area near the originally targeted parking lot is detected.

FIGS. 6 and 7 show the details of the process, in step S22 in FIG. 3, of selecting an alternative route or an alternative parking lot in response to the detection of traffic congestion in an area close to an originally selected parking toward which the vehicle is currently running. In this process, as shown in FIG. 6, first, a detour route to the currently targeted parking lot is searched for (step S71). That is, in step S21 shown in FIG. 3, the situation in terms of traffic congestion along the navigation route near the currently selected parking lot is monitored while traveling along the navigation route. If traffic congestion along the navigation route near the currently targeted parking lot is detected, a detour route to the currently targeted parking lot is first searched for. This process is performed by the detour route calculation unit 31 of the navigation route setting unit 28 shown in FIG. 1 in a similar manner as is performed by the conventional navigation apparatus.

Figure 15A:
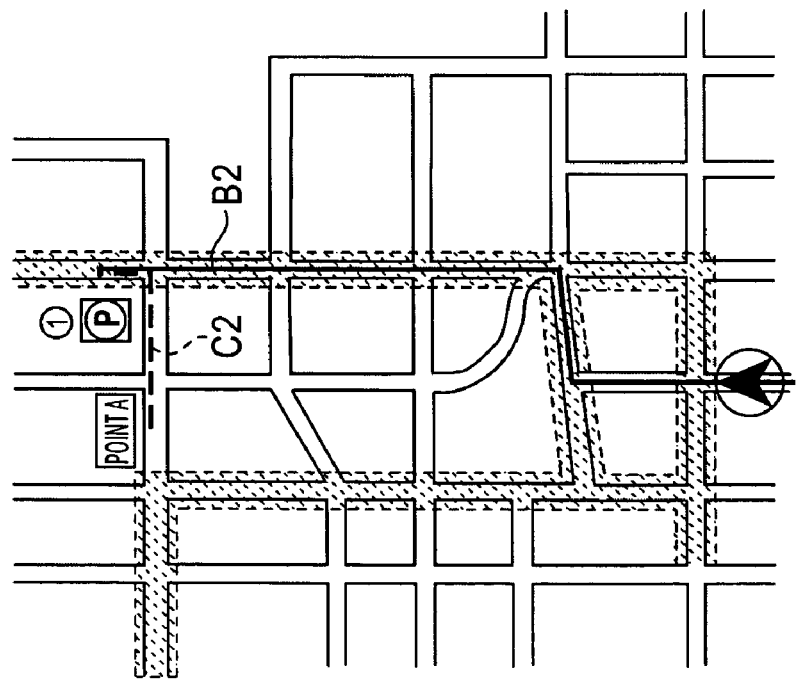
FIG. 15A is a diagram illustrating a situation in which traffic congestion occurs on a route along which route guidance is being provided.
Figure 15B:
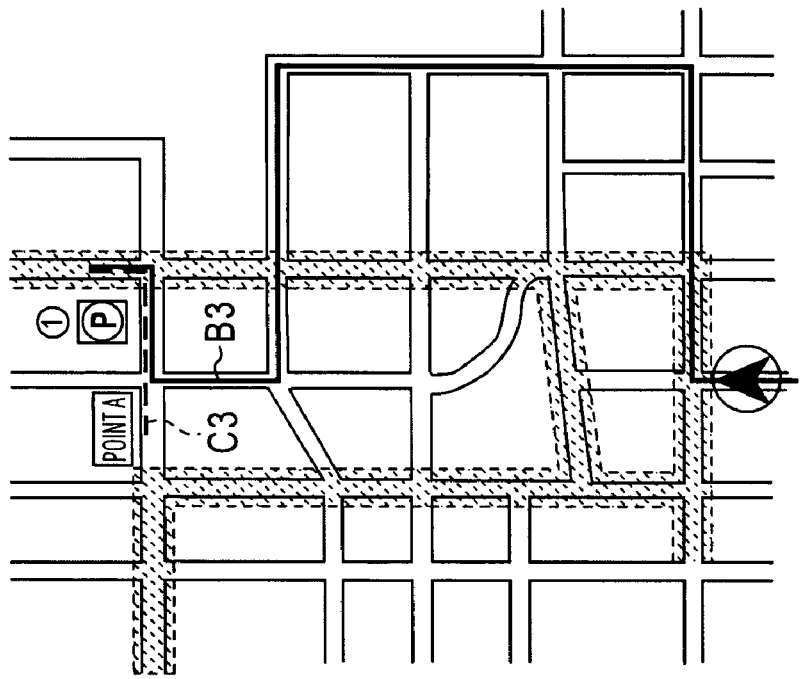
FIG. 15B is a diagram illustrating a manner in which the traffic congestion shown in FIG. 15A is avoided by taking a detour route.

For example, as shown in FIG. 15A, when a vehicle is traveling along a navigation route B2, denoted by a bold line in FIG. 15A, toward a currently targeted parking lot P1 close to a point A at which a destination facility is located, if traffic congestion occurs on roads denoted by shading in FIG. 15A, traveling along the currently selected route to the parking lot P1 results in encountering traffic congestion along almost the entire route. Thus, when such traffic congestion is detected, a detour route to the currently targeted parking lot P1, such as a route B3 denoted by a bold line in FIG. 15B, is searched for to avoid the traffic congestion as much as possible.

Thereafter, the predicted driving time (Bt3) needed to drive to the currently targeted parking lot via the detour route is calculated (step S72), and the predicted walking time (Ct3) needed to walk from the parking lot to the destination facility is calculated (step S73). Furthermore, the predicted total time (At3) needed when the detour route is used is calculated (step S74). As a result of the calculations, the driving time Bt3 along the detour route B3 shown in FIG. 15B and the walking time Ct3 from the parking lot P1 to the destination facility located at the point A are obtained, and, from those values, the total time At3 is obtained.

Furthermore, for the purpose of searching for alternative parking lots other than the originally targeted parking lot, searching is performed to detect a plurality of parking lots for dedicated or semi-dedicated use by visitors or parking lots for general use (step S75). In this searching step, already obtained data may be used, if the data obtained in the process, in step S5 in FIG. 2, of searching for parking lots located close to the destination facility is stored.

For those parking lots detected in the above process, the predicted driving time (Bt4) needed to get thereto is calculated (step S76). Furthermore, the predicted walking time (Ct4) needed to walk from each parking lot to the destination facility is calculated (step S77), and the predicted total time (At4) needed to get to the destination facility from each parking lot is calculated (step S78). Thereafter, the process proceeds to step S79 shown in FIG. 7. In step S79 shown in FIG. 7, following the calculations described above, it is determined whether there is an alternative parking lot that has a shorter total time than the total time needed in the case in which the original parking lot is used and the detour route is taken.

Figure 16A:
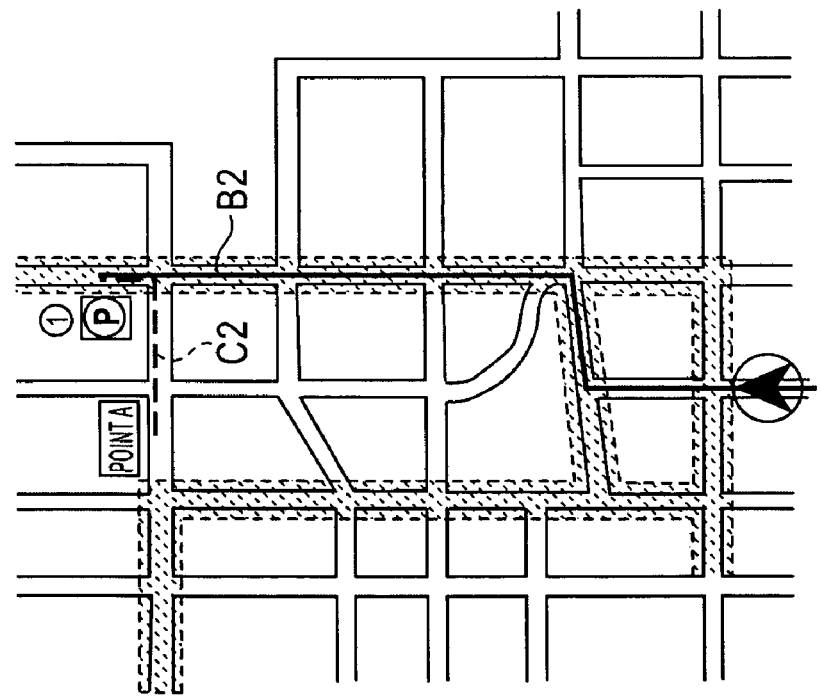
FIG. 16A is a diagram illustrating a situation in which traffic congestion occurs along a route for which route guidance is being provided.
Figure 16B:
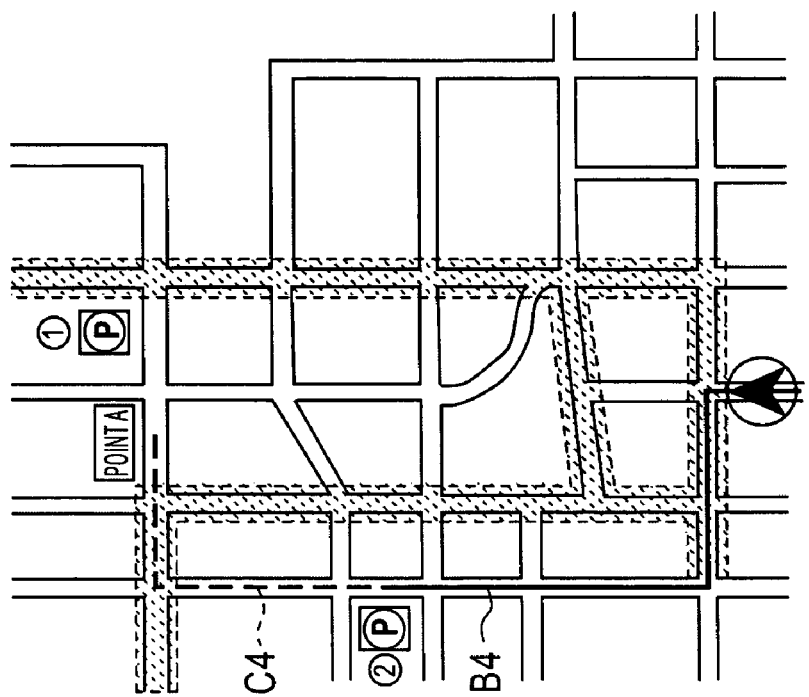
FIG. 16B is a diagram illustrating a manner in which the traffic congestion shown in FIG. 16A is avoided by selecting another parking lot other than a parking lot originally planned to be used.

More specifically, for example, when a vehicle is running along a navigation route B2 shown in FIG. 16A toward a currently targeted parking lot P1 as in the case shown in FIG. 15A, if traffic congestion is detected on roads denoted by shading in FIG. 16A, and if many portions of the navigation route B3 are included in the congested area, an alternative parking lot, such as a parking lot P2 shown in FIG. 16B other than the originally targeted parking lot P1, is searched for in the above-described process. For example, a navigation route B4 to the alternative parking lot P2 is detected, and a walking route C4 from the parking lot P2 to the destination facility is detected, as denoted by a dotted line in FIG. 16B. The necessary times along the driving route B4 and the walking route C4 are given respectively as Bt4 and Ct4 as described above, and the total time At4 is calculated. The predicted total time At3 needed when the detour route is simply used is then compared, in step S79, with the predicted total time At4 needed when the alternative parking lot and the newly detected route thereto are used.

If it is determined in step S79 that the total time (At4) needed when the alternative parking lot other than the originally targeted parking lot is used is shorter than the total time (At3) needed when the detour route is simply used without changing the parking lot, then it is further determined whether there are two or more such alternative parking lots (step S80). In the case in which there are two or more such alternative parking lots, a parking lot that is least in total time is selected (step S81), and a route to the selected parking lot is selected. Alternatively, as described in detail later, when two or more such parking lots are detected, those detected parking lots may be presented to a user so that the user can select a most suitable one from the presented candidates.

Figure 17:
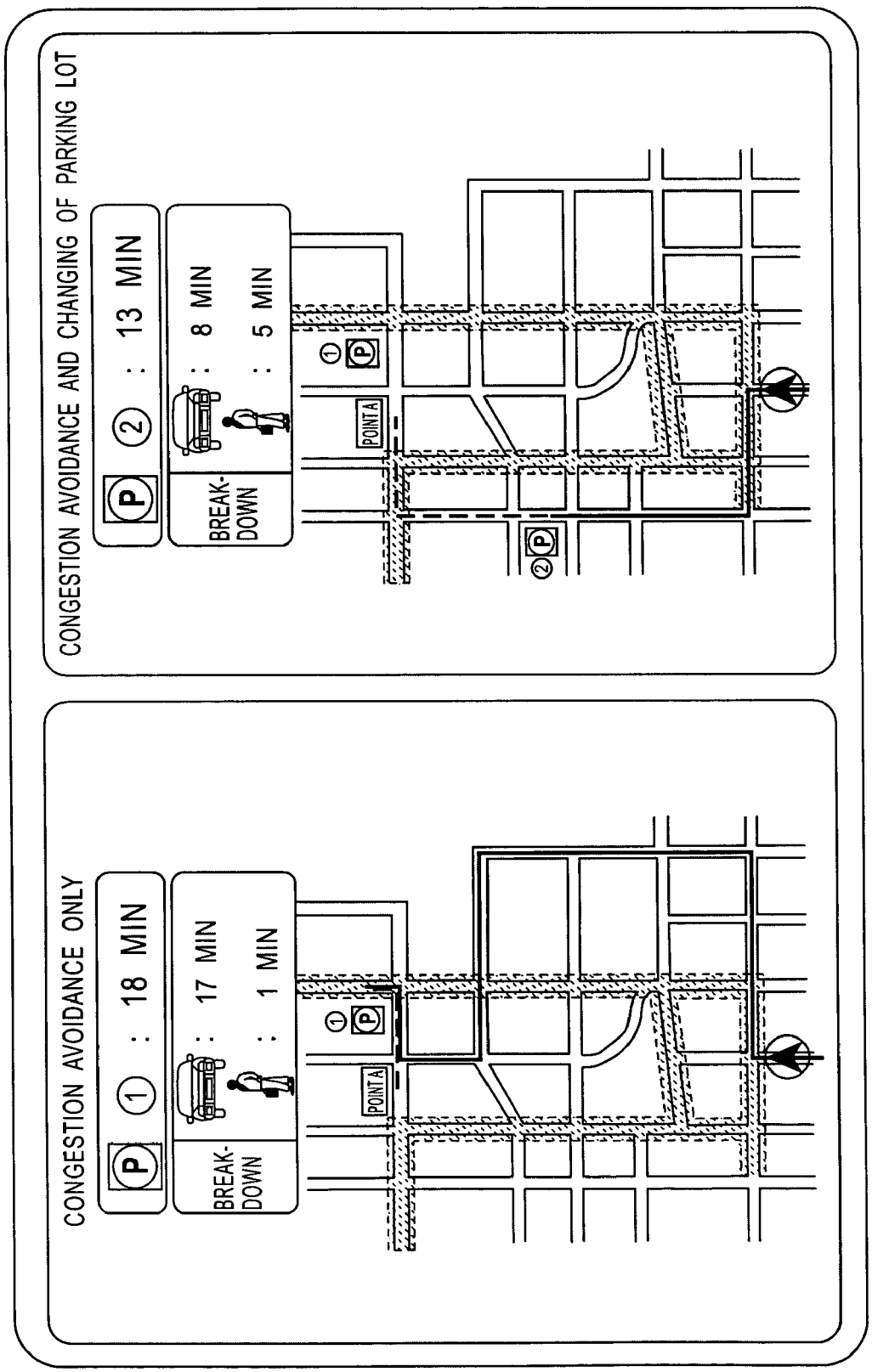
FIG. 17 is a diagram illustrating a display screen including two sub-screens in which two recommended routes selectable to avoid traffic congestion are displayed.
Figure 18:
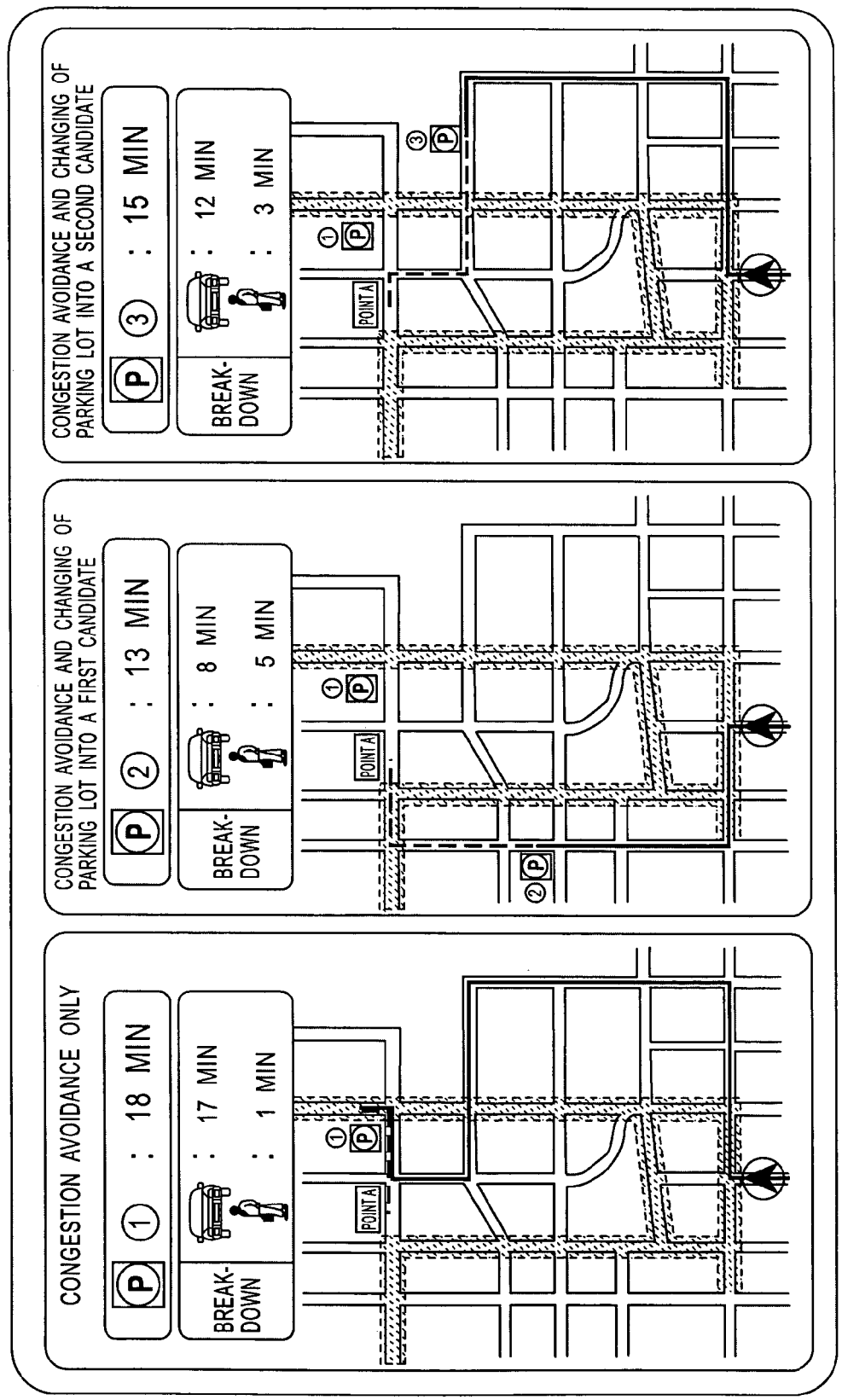
FIG. 18 is a diagram illustrating a display screen including three sub-screens in which three recommended routes selectable to avoid traffic congestion are displayed.
Figure 19:
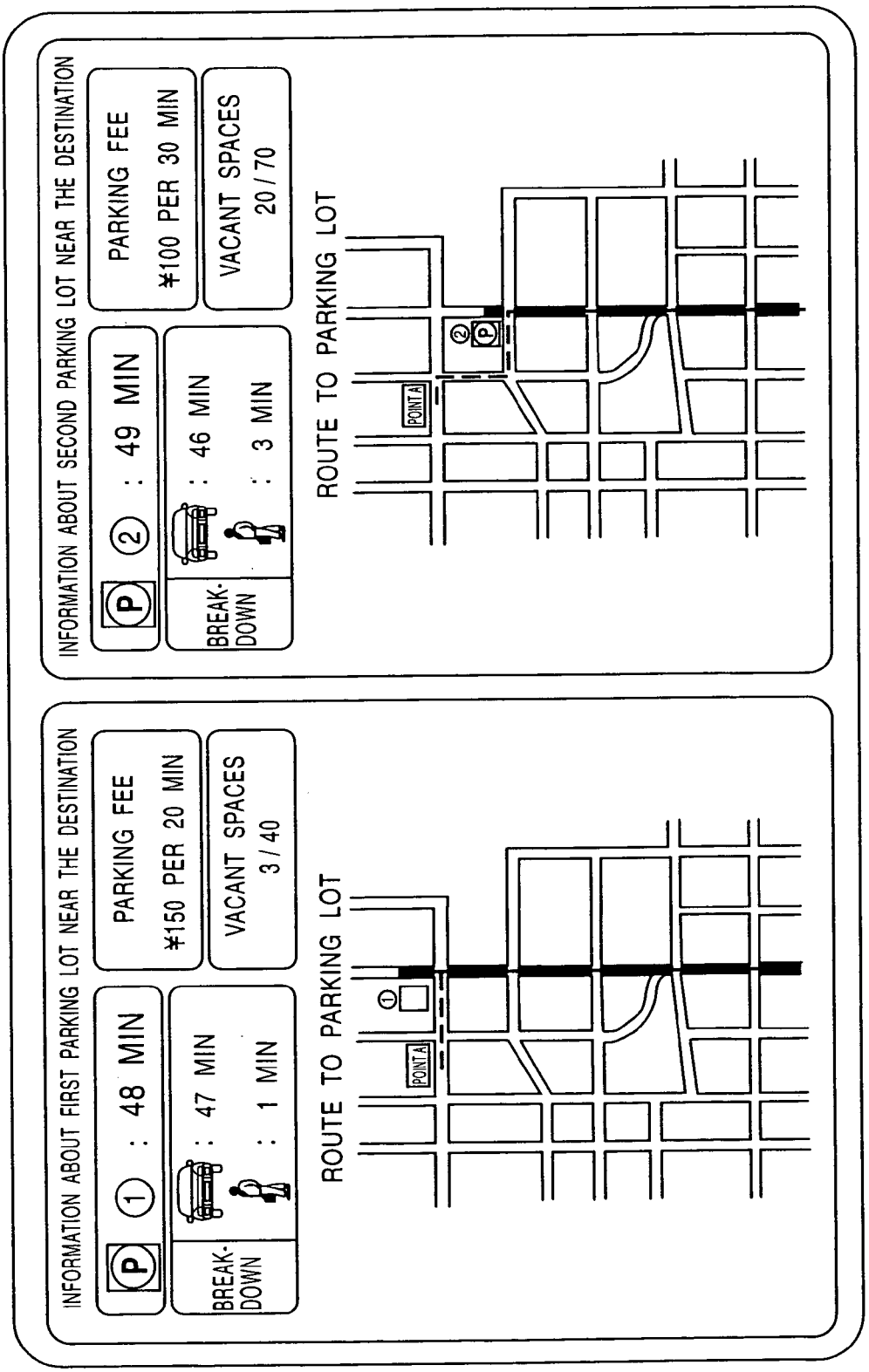
FIG. 19 is a diagram illustrating a selection screen for use by a user to select a parking lot near a destination.

To present, to a user, information on the basis of which to determine whether a detour route is used or an alternative parking lot is selected, for example, the total time needed to get to the destination facility using the detour route, the breakdown thereof, the driving route, and the walking route are displayed in a left-hand half area of the screen of the display as shown in FIG. 17 (step S82). On the other hand, as shown in FIG. 17, the total time needed to travel to the destination facility by using an alternative parking lot, the breakdown thereof, the driving route, and the walking route are displayed in the other half area of the screen of the display (step S83). From the information displayed on the screen of the display, the user can easily determine which is more desirable.

In the case in which it is determined in step S80 in FIG. 7 that two or more alternative parking lots are detected which allow a reduction in total time compared with the total time needed when traveling to the originally targeted parking lot via the detour route, as many alternatives as possible may be displayed on the display screen divided into subscreens. In a specific example shown in FIG. 18, the display screen is divided into three subscreens, and information about a parking lot P3 is displayed in a rightmost subscreen shown in FIG. 18 in addition to the information, displayed in subscreens shown in FIG. 17, about the originally targeted parking lot P1 and the alternative parking lot P2 displayed in the leftmost and middle subscreens, respectively. In the specific example shown in FIG. 18, when the parking lot P3 is selected, it is possible to arrive at the point A, at which the destination facility is located, by simply using the detour route to the originally targeted parking lot, and the walking time is shorter than that needed when the parking lot P2 is used although the total time is longer by 2 min than that needed when the parking lot P2 is used. Instead of dividing the display screen into three subscreens, routes to alternative parking lots and related information may be displayed in the same screen in a scrollable fashion.

Referring again to the flow chart shown in FIG. 7, it is then determined whether to make a comparison with a case in which still another alternative parking lot is used (step S84). If the user determines that no more comparison is necessary, the user inputs a command to inform the navigation apparatus that no more comparison is necessary, and the user selects a proper route from the presented routes (step S85), and the process is ended (step S87). However, in the case in which in step S84 the user decides to make a further comparison with a case in which another alternative parking lot is used, the process proceeds to step S86. In step S86, data associated with the case in which another alternative parking lot is used is read (step S86). Thereafter, the process returns to step S82, and information associated with the case in which the alternative parking lot is used is displayed in a subscreen of the display. The displaying of information is performed repeatedly until the user selects a desirable parking lot and a route thereto. If the user selects a desirable parking lot and a route thereto, the process is ended.

The details of the schedule checking process performed in step S27 or S32 shown in FIG. 3 or in step S160 shown in FIG. 11 that will be described later are shown in the form of a flow chart in FIG. 8. First, it is determined whether to perform the process of checking the schedule, that is, whether it is required to perform this process (step S91). This process is optional, and setting as to whether to perform this process may be made by the user as a default setting in advance or a selection screen may be displayed on the display screen so that the user can select whether to perform the process. If the determination as to whether to perform the process is affirmatively made, the following steps are performed.

First, the predicted arrival time at a destination is calculated (step S92). This calculation is performed for various cases depending upon the situation. That is, the predicted arrival time at the destination for the case in which the current route is maintained, the predicted arrival time at the destination for the case in which a route is determined taking into account traffic congestion without changing the currently targeted parking lot, the predicted arrival time at the destination for the case in which an alternative parking lot is used to avoid traffic congestion, or the predicted arrival time at a point to which to take a passenger by vehicle in a normal traffic condition or a congested condition is calculated.

Thereafter, schedule data is read (step S93). The schedule data may be directly input by the user or, if the navigation apparatus has a schedule registration capability, schedule data corresponding to the current destination described in the destination data may be read. For example, the start time of a conference to be held at the place specified as the destination facility is read.

It is then determined whether the currently predicted driving time allows arrival by the required time specified by the schedule (step S94). Herein, if it is determined that the current driving status does not allow arrival by the required time, a warning message is immediately displayed on the screen and a voice message is also output if necessary (step S95). Thereafter, the process is ended (step S97). On the other hand, if it is determined in step S94 that the current driving status allows arrival by the required time specified by the schedule, a message such as "The destination is going to be reached 15 min before the start time of the conference" is displayed, and a voice message is output if necessary (step S96). The checking of the schedule is performed periodically until the user arrives at the destination or until a passenger gets off the vehicle.

The details of the process of providing information as to the getting-off point for a passenger performed in step S26 shown in FIG. 3 are described below with reference to FIG. 9. In this process, for example, when a vehicle is traveling toward a parking lot to visit, for example, a department store A, if the vehicle encounters traffic congestion that cannot be avoided even by using a detour route or an alternative parking lot, the navigation apparatus presents getting-off point information indicating, for example, that leaving the vehicle and walking to the department store A will be better than remaining on the vehicle until arriving at the parking lot.

Figure 9:
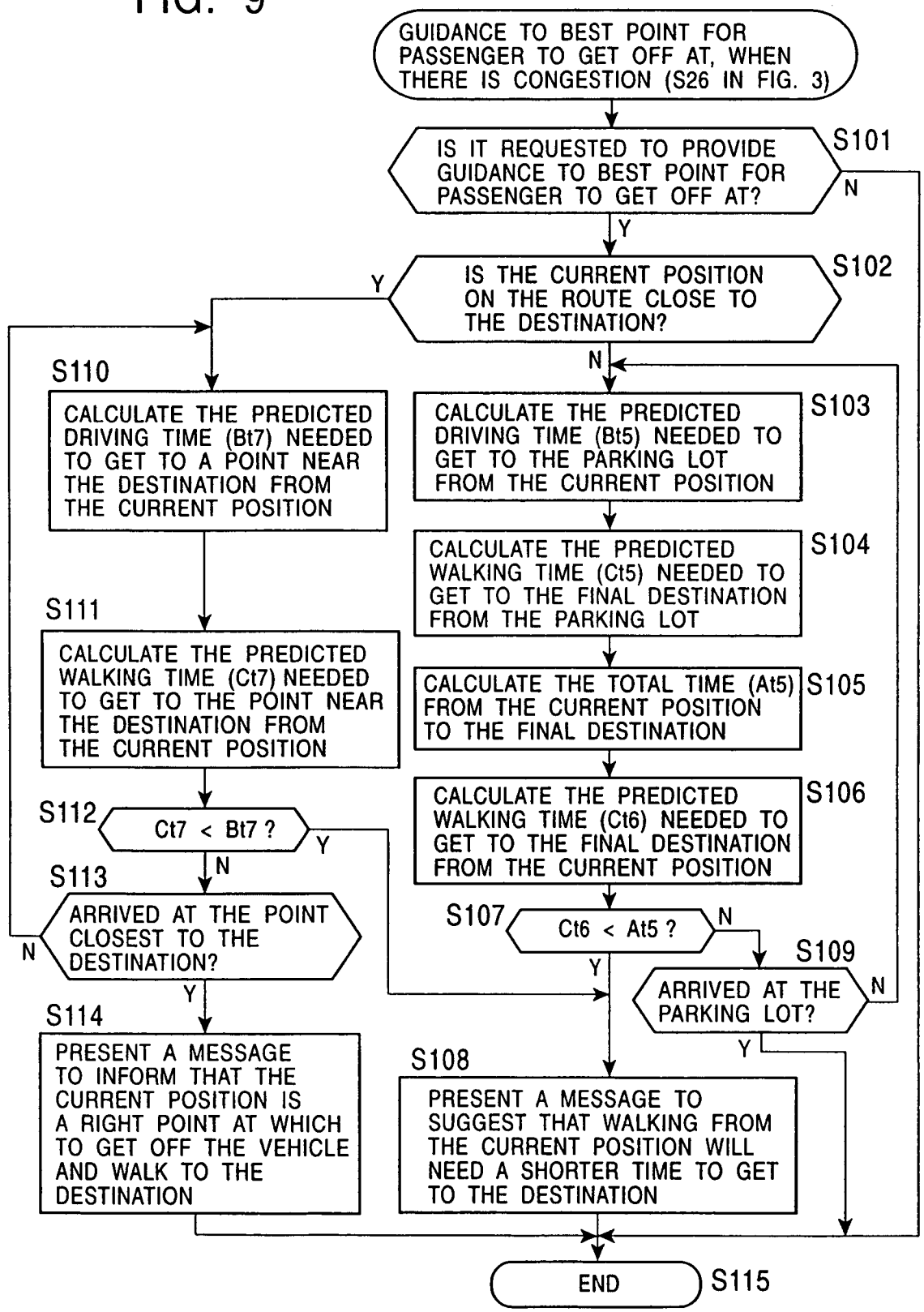
FIG. 9 is a flow chart illustrating a process of providing guidance information about a getting-off point for a passenger on a vehicle in a congested situation, in accordance with the present invention.

At the start of the processing of providing information as to the getting-off point for a passenger in a congested situation, as shown in FIG. 9, it is determined whether to perform this process (step S101). That is, this process is optional in the destination guidance process, and it is determined whether the user wants to perform this process. If it is determined that this process should be performed, the flow proceeds to the next step S102. However, if it is determined that this process is not necessary, the process jumps to step S115 to return to step S27 in FIG. 3.

In the case in which in step S101 the user specifies to perform the process of providing information as to the getting-off point for a passenger to deal with current traffic congestion, it is determined whether the destination facility is located close to a point in the middle of the navigation route along which the vehicle is currently traveling (step S102). There can be two situations. In one situation, for example, the department store A is located close to a point in the middle of the route along which the vehicle is currently traveling toward the parking lot. Thus, it is better for the passenger to get off the vehicle at the point close to the department store in the middle of the route instead of remaining on the vehicle until reaching the parking lot regardless of whether there is traffic congestion or not. In the other situation, the location of the department store A is not in the middle of the route, and it is better to take the passenger to the parking lot if there is no congestion. In order to correctly perform the process depending upon the situation, step S102 is performed to detect the current situation.

If it is determined in step S102 that the destination facility is not located close to a point in the middle of the route, the predicted driving time (Bt5) needed to get to the parking lot from the current position is calculated (step S103). The predicted walking time (Ct5) needed to walk to the destination facility from the parking lot is then calculated (step S104). The predicted total time (At5) needed to get to the destination facility from the current position via the parking lot is then determined by calculating the sum of the predicted driving time and the predicted walking time (step S105).

Thereafter, the predicted walking time (Ct6) needed to walk to the destination facility from the current position is calculated. The predicted walking time (Ct6) needed to walk to the destination facility after getting off the vehicle at the current position is compared with the predicted total time (At5) needed to get to the destination facility from the current position via the parking lot. When the vehicle comes to a particular point on the route, if it is detected that the predicted walking time (Ct6) needed to walk to the destination facility from that point is shorter than the predicted total time (At5) needed to get to the destination facility via the parking lot, a textual message or a voice message is generated to inform the driver that it is better for the passenger to get off the vehicle at the current position and walk to the department store A specified as the destination facility to arrive there earlier (step S108). Thereafter, the process is ended (step S115).

On the other hand, if it is determined in step S107 that the vehicle has not yet come to a point at which the predicted walking time (Ct6) needed to walk to the destination facility from that point becomes shorter than the predicted total time (At5) needed to get to the destination facility from that point via the parking lot, then driving is continued and it is determined whether the parking lot has been reached (step S109). In the case in which it is determined that the parking lot has not yet been reached, the process returns to step S106 to repeat the comparison process described above. However, if it is determined in step S109 that the parking lot has been reached, the process is ended (step S115).

On the other hand, if it is determined in step S102 that the location of the destination facility is close to a point in the middle of the route, then getting off the vehicle before reaching the parking lot and walking to the destination facility can allow earlier arrival at the destination facility. In this case, the predicted driving time (Bt7) needed to drive to the point close to the destination facility from the current position (step S110), and the predicted walking time (Ct7) needed to walk from the current position to the destination facility (step S111). Thereafter, those two predicted values are compared with each other (step S112). If the vehicle has come to a point at which the predicted walking time (Ct7) becomes shorter than the predicted driving time (Bt7), that is, walking from that point allows earlier arrival, the process proceeds to step S1 textual message or a voice message is produced to inform the user that earlier arrival is possible if the passenger gets off the vehicle and walks to the destination facility. After step S108, the process is ended.

In the case in which it is determined in step S112 that the vehicle has not yet reached a point from which walking allows earlier arrival, it is determined whether the vehicle has arrived at the point closest to the destination facility (step S113). If the vehicle has not yet arrived at such a point, the process returns to step S110 to repeat the calculation and the comparison of the predicted driving time and the predicted walking time from the current position to the destination facility in the similar manner as described above. In the case in which it is determined in step S113 that the vehicle has arrived at the point closest to the destination facility, a textual message or a voice message is produced to inform the user that the vehicle has arrived at the point closest to the destination facility and thus it is better for the passenger to leave the vehicle and walk to the destination facility. After completion of producing the message, the process is ended (step S115).

Figure 10:
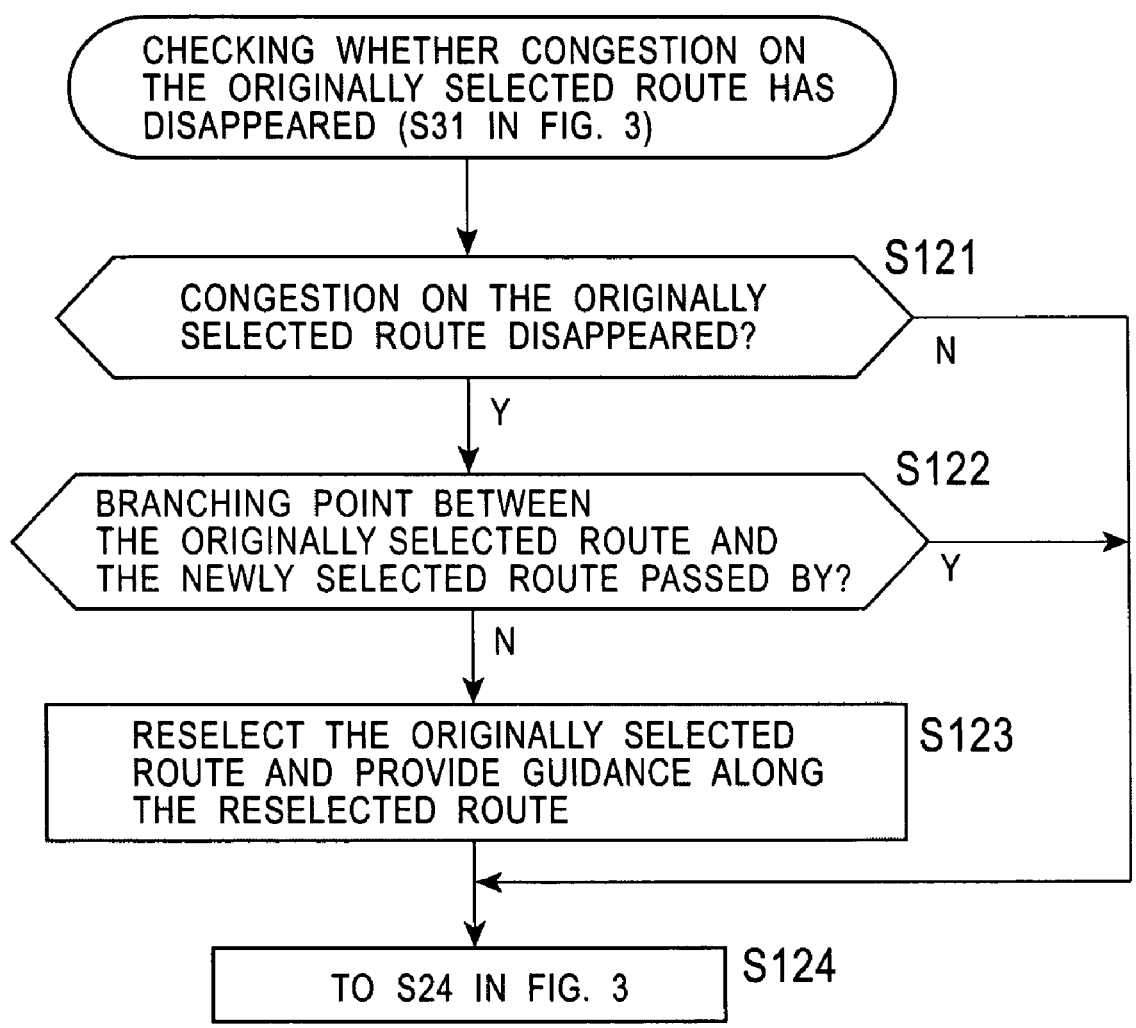
FIG. 10 is a flow chart illustrating a process of checking whether traffic congestion along a route originally planned to take has disappeared, according to the present invention.

The details of the process of checking whether detected traffic congestion has disappeared are described with reference to a flow chart shown in FIG. 10. This checking process is performed when it is determined in step S28 in FIG. 3 that the vehicle has not yet arrived at a currently targeted parking lot. In such a situation in which traffic congestion along a navigation route in an area near an originally targeted parking lot is detected in the process shown in FIG. 3, and, in response to the detection of the traffic congestion, the vehicle is traveling along a route to an alternatively selected parking lot or a detour route to the originally targeted parking lot (step S31). Referring to the flow chart shown in FIG. 10, in the process of checking whether the traffic congestion detected along the original route has disappeared, it is first determined whether traffic congestion detected along the original route has disappeared (step S121). If it is determined that the traffic congestion has not yet disappeared, the process returns to step S24 to continue the previous process in which checking of whether the vehicle has arrived at the currently targeted parking lot is performed repeatedly until the vehicle has arrived there.

If it is determined in step S121 that the traffic congestion on the original route has disappeared, then it is determined whether the vehicle has passed through a branch point between the original navigation route and the newly selected route (step S122). In the case in which the vehicle has already passed through the branch point, additional running is required to return to the original route even if the traffic congestion has disappeared. Herein, it is assumed that such additional running to return to the original route is not necessary, and the process proceeds to step S124. In step S124, the process returns to step S24 shown in FIG. 3, and step S24 and steps following that are performed repeated until the vehicle arrives at the currently targeted parking lot.

On the other hand, in the case in which it is determined in step S122 that the vehicle has not yet passed through the branch point between the originally selected navigation route and the currently selected navigation route, the original navigation route is reselected and route guidance along the reselected route is provided (step S123). That is, in this case, even when the vehicle is currently traveling along a newly selected route other than the original route, the vehicle can return to the original route that is the most suitable route, and the navigation guidance is continued until it is determined in step S28 that the vehicle has arrived at the targeted parking lot.

The details of the process of providing route guidance to take a passenger to a getting-off point by vehicle, performed in step S13 in FIG. 2, are described with reference to the flow chart shown in FIG. 11. This process is performed, for example, in such a situation in which a passenger is taken to a station or a place at which an examination or the like is held. In the first step, as shown in FIG. 11, a plurality of routes from the current position to a point to which to take the passenger are searched for, and the detected routes are displayed (step S151). The user selects an arbitrary route from those displayed (step S152). In response, the navigation apparatus provides route guidance along the navigation route (step S153).

Congestion information is acquired when the vehicle is running (step S154), and it is determined whether there is traffic congestion in the area near the point to which to take the passenger (step S155). If traffic congestion near a station or an examination place specified as the destination is detected, a detour route is searched for and a detected detour route is displayed (step S156). The user determines whether a suitable detour route has been detected (step S157). If a suitable detour route has been detected, it is determined that it is not necessary for the passenger to leave the vehicle on the way to the destination, and the vehicle travels along the detected detour route (step S162). In the next step, it is determined whether the vehicle has arrived at the destination at which the passenger is to get off the vehicle (step S163). If the vehicle has not yet arrived at the destination, the process returns to step S154 to acquire updated congestion information indicating the current congestion status. Thereafter, steps following step S154 are repeated in a similar manner as described above.

If it is determined in step S163 that the vehicle has arrived at the destination such as a station, the process proceeds to step S164. In step S164, the process returns to step S29 in FIG. 3 to provide guidance information for a walking route after leaving the vehicle, as required. In the case in which it is determined in step S155 that there is no traffic congestion in an area near the destination point to which to take the passenger, it is determined that it is not necessary to provide information as to a getting-off point before the destination point, and thus the process jumps to step S163. In step S163, it is determined whether the vehicle has arrived at the destination point to which to take the passenger. If no, then the process returns to step S154 to repeat the above-described process. That is, congestion information is repeatedly acquired until the vehicle arrives at the destination point.

In the case in which in step S157 the user determines that there is no suitable detour route to deal with the detected traffic congestion, it is determined whether the passenger has the intention of getting off the vehicle to walk to the destination if walking allows earlier arrival (step S158). However, if the passenger decides to remain in the vehicle until the vehicle arrives at the destination point because the predicted arrival time of the vehicle is early enough although walking allows earlier arrival, the process jumps to step S163. In step S163, it is determined whether the vehicle has arrived at the destination point to which to take the passenger. If no, the above-described process is repeated without presenting information as to a getting-off point on the way to the destination point.

Figure 12:
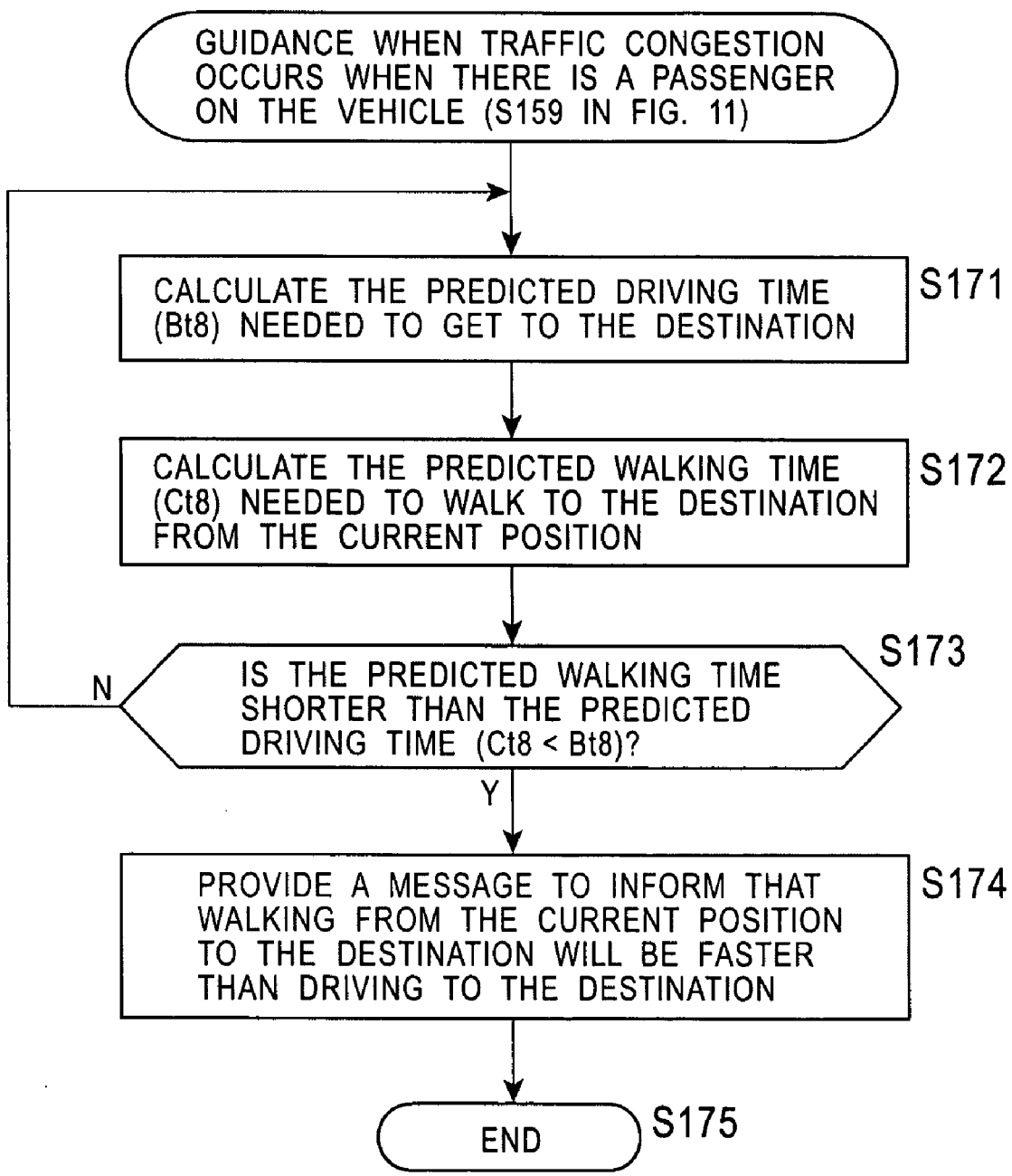
FIG. 12 is a flow chart showing a process of presenting guidance information indicating a best point at which a passenger can get off the vehicle in a congested situation, in accordance with the present invention.

In the case in which in step S158 it is determined that the passenger has the intention of getting off the vehicle to walk to the destination if walking allows earlier arrival, the process of presenting information as to a getting-off point for the passenger in a congested situation, as will be described in detail later with reference to a flow chart shown in FIG. 12 (step S159). Thereafter, the schedule checking process described earlier with reference to the flow chart shown in FIG. 8 is performed (step S160). In the next step, it is determined whether the vehicle has arrived at the destination point to which to take the passenger (step S161). If it is determined that the vehicle has not yet arrived at the destination point, the process returns to step S159 to repeat the process of presenting getting-off point information for the passenger in a congested situation. If it is determined in step S161 that the vehicle has arrived at the destination point, the process proceeds to step S164. In step S164, the process returns to step S29 in FIG. 3 in which presenting of guidance information as to a walking route from the getting-off point to the final destination facility is performed.

The details of the process, in step S159 in FIG. 11, of presenting information as to a getting-off point for a passenger in a congested situation are described below with reference to a flow chart shown in FIG. 12. First, the predicted driving time (Bt8) from the current position to a getting-off point such as a station is calculated (step S171). The predicted walking time (Ct8) from the current position to the getting-off point is then calculated (step S172). In the next step, it is determined whether the predicted walking time is shorter than the predicted driving time (Ct8<Bt8) (step S173).

If it is determined that the predicted walking time is shorter, that is, it is possible to arrive earlier at the station if the passenger walks instead of traveling by vehicle, a textual message or a voice message is produced to inform the user that walking allows earlier arrival (step S174), and the process is ended (step S175). If it is determined in step S173 that going further by vehicle allows earlier arrival, the flow returns to step S171 to repeat the above-described process. That is, the predicted times that vary with the location of the vehicle are calculated repeatedly, and the decision step is repeated.

The details of the process, in step S30 in FIG. 3, of providing guidance information about the walking route from a getting-off position to a final destination facility are described below with reference to a flow chart shown in FIG. 13. This process is performed in a situation in which after the completion of providing various guidance services associated with the driving of the vehicle to a destination point, if it is determined in step S29 in FIG. 3 to provide to a user guidance information about a walking route from the getting-off point to a final destination facility by transmitting the information to a portable telephone of the user.

Figure 13:
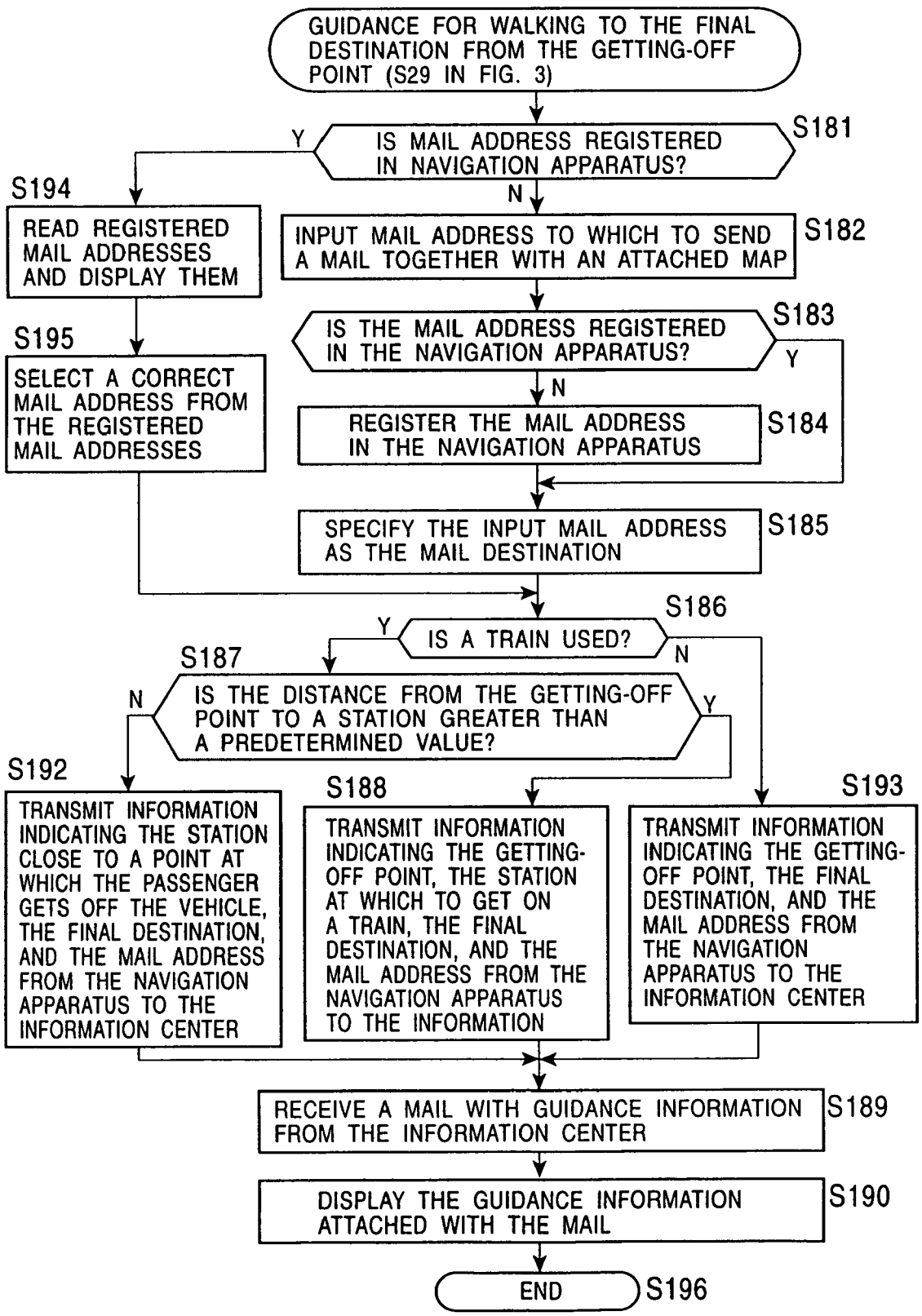
FIG. 13 is a flow chart showing a process of providing guidance on a walking route from a getting-off point to a final destination facility, according to the present invention.

Referring to FIG. 13, at the first step, it is determined whether an electronic mail address is already registered in the navigation apparatus (step S181). If it is determined that the electronic mail address is not yet registered, the mail address at which to receive a mail with attached map information by portable telephone is input (step S182). In the next step, it is determined whether the input mail address is registered in the navigation apparatus (step S183). If it is determined that the mail address should be registered, the process is proceeds to step S184 to register the mail address. Once the mail address is registered, the mail address can be immediately read simply by selecting a user name or the like. If the registration of the mail address is completed or if it is determined in step S183 that registration of the mail address is not necessary, the input mail address is specified as the destination address to which to transmit guidance information (step S185).

On the other hand, in the case in which it is determined in step S181 that the mail address is already registered in the navigation apparatus, registered mail addresses are read and displayed (step S194). From the mail addresses displayed, the user selects an address of his/her portable telephone to which to transmit guidance information (step S195).

After completion of specifying the input mail address as the destination address to which to transmit guidance information in step S185 or selecting a mail address as the destination address from the registered addresses in step S195, it is determined whether the user is going to use a train (step S186). The determination is made in accordance with a selection made by the user as to whether to use a train via the selection screen displayed on the monitor display. If it is determined that the user is going to use a train, the process proceeds to step S187. In step S187, it is determined whether the distance from the getting-off point to a station at which to get on a train is greater than a predetermined value (step S187).

Figure 11:
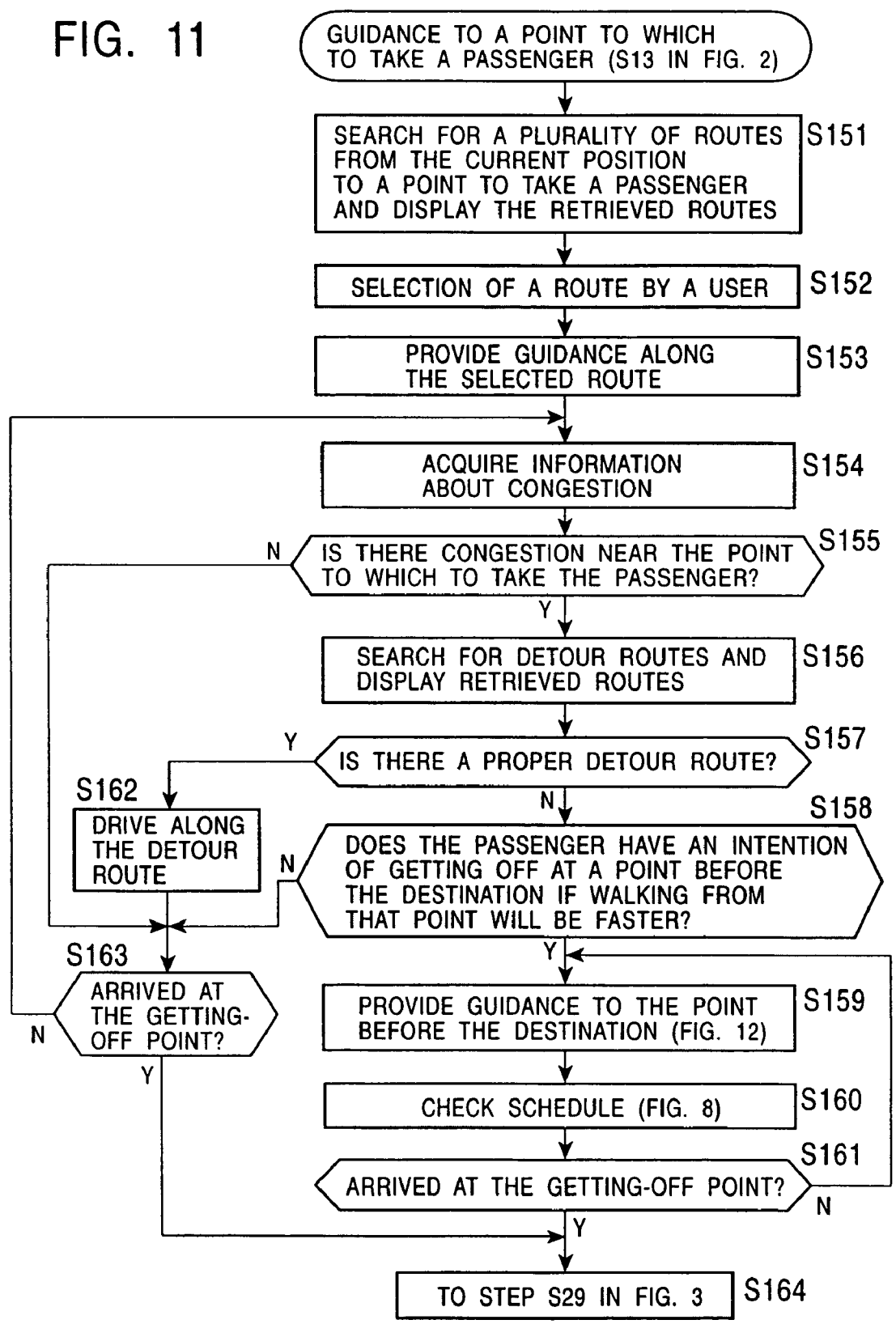
FIG. 11 is a flow chart illustrating a process of providing route guidance to a point to which to take a passenger by vehicle, according to the present invention.

If the distance from the getting-off point to the station is greater than the predetermined value, as is the case when the vehicle encounters traffic congestion on the way of taking a passenger to the station, in step S161 in FIG. 11, the passenger gets off the vehicle at a point a larger distance apart from the station than the predetermined value and walks to the station in order to reach the station earlier than if going further by vehicle. Then, in step S188 in FIG. 13, the navigation apparatus transmits, to an information center, data indicating the getting-off point, the station at which the user is going to get on a train, and the final destination together with data indicating the mail address to which to transmit guidance information.

Upon receiving the data, the information center transmits, to the specified mail address of the user, a mail with attached guidance information associated with a walking route and a train route (step S189). If the user receives the mail, the user displays the guidance information attached with the main on the display and gets to the final destination in accordance with the guidance information about the walking route from the getting-off point to the station, the train route from the station to a station closest to the final destination, such as a place whether an entrance examination or the like is going to be held, and the walking route to the final destination from the station closest to the final destination.

In the case in which it is determined in step S187 that the getting-off point is not further from the station by a distance greater than the predetermined value, that is, in the case in which the getting-off point is close to the station, the process proceeds to step S192. In step S192, the navigation apparatus transmits, to the information center, data indicating the station at which the user is going to get on a train and the final destination together with data indicating the mail address to which to transmit guidance information. Thereafter, the user receives from the information center information similar to the information described above except that the information does not include information about the walking route from the getting-off point to the station, and the user gets to the final destination in accordance with the received information.

In the case in which it is determined in step S186 that the user is not going to use a train, the process proceeds to step S193. In step S193, the navigation apparatus transmits, to the information center, data indicating the getting-off point and the final destination together with data indicating the mail address to which to transmit guidance information. The information center transmits a mail with attached guidance information which does not include guidance information about a train in this case. The user gets to the final destination in accordance with the received information. After the completion of displaying various kinds of guidance information depending upon the situation, the process is ended (step S196).

To provide various kinds of guidance information to a user after the user gets off a vehicle, instead of transmitting the guidance information from an information center to a portable information device, such as a portable telephone of the user, the navigation apparatus may directly transmit, to the portable information device of the user, guidance information about a route calculated by the navigation apparatus, if the navigation apparatus has the route calculation capability. In this case, the navigation apparatus may acquire guidance information about a train route from an information center and may transmit the acquired guidance information together with the above information.

Specific examples of various functions provided by the present invention have been described above. Note that the present invention is not limited to those functions described above, but other various kinds of functions can also be achieved.

As can be understood from the above description, the present invention provides various great advantages. That is, when a vehicle is traveling along a route in accordance with route guidance provided by the navigation apparatus, if traffic congestion along the navigation route in an area close to a destination is detected, in addition to presenting a detour route, the navigation apparatus presents guidance information about a route to an alternative parking lot other than an originally targeted parking lot, and the navigation apparatus also presents information indicating a predicted time needed to get to the destination, including a walking time from the alternative parking lot to a final destination facility. When a vehicle encounters traffic congestion, the navigation apparatus calculates whether a passenger on the vehicle can arrive at a destination earlier if the passenger gets off the vehicle and walks to the destination rather than going further on the vehicle. If the navigation apparatus detects such a point, the navigation apparatus presents a message to inform the user. As required, the navigation apparatus also presents guidance information indicating a best point at which a passenger gets off a vehicle and gets on a train. As for information according to which a user selects a proper parking lot, the navigation apparatus can also calculate and display a walking time from a parking lot to a destination facility.

What is claimed is:

1. A navigation apparatus comprising:
   a storage unit for storing the location of a destination;
   a route setting unit for determining a route to a parking lot located near the destination;
   a time calculation unit for calculating a predicted driving time needed to drive to the parking lot, a predicted walking time needed to walk from the parking lot to the destination, and a predicted total time, the predicted total time being a sum of the predicted driving time and the predicted walking time;
   a congestion information unit for detecting current traffic congestion along the route in an area near the destination; and
   a search unit for searching for an alternative parking lot having a shorter predicted total time when the congestion information unit detects traffic congestion in the area near the destination, where the shorter predicted total time associated with the alternative parking lot is (1) a total time predicted to drive to the alternative parking lot and walk from the alternative parking lot to the destination and (2) determined to be less than the predicted total time required to reach the destination by driving to the parking lot in view of the detected traffic congestion and then walking from the parking lot to the destination,
   wherein the route setting unit determines a route to the alternative parking lot.

2. A navigation apparatus according to claim 1, wherein the congestion information unit detects traffic congestion that develops as a vehicle is traveling.

3. A navigation apparatus according to claim 2, further comprising a route selection unit, wherein the route setting unit determines a detour route for avoiding traffic congestion and the route selection unit presents to a user the detour route and the route to the alternative parking lot.

4. A navigation apparatus according to claim 3, wherein the route to the alternative parking lot has a shorter predicted total time than the predicted total time for a detour route to an originally targeted parking lot.

5. A navigation apparatus according to claim 1, further comprising:
   a congestion monitor for monitoring, when traveling along the route to the alternatively selected parking lot, whether traffic congestion along the route originally planned to be used has dissipated,
   wherein the navigation apparatus provides route guidance along the original route if the congestion monitor detects that the traffic congestion has dissipated.

6. A navigation apparatus according to claim 5, wherein if a vehicle has passed through a point at which the route to the alternatively selected parking lot is branched from the route originally planned to be used, the congestion monitor stops monitoring.

7. A navigation apparatus according to claim 1, wherein the traffic congestion information is obtained by means of a vehicle-to-vehicle communication.

8. A navigation apparatus comprising:
   a storage unit for storing a location of a destination;
   a route setting unit for determining a route to at least one parking lot located near the destination;
   a time calculation unit for calculating a predicted driving time needed to drive to each parking lot, a predicted walking time needed to walk from each parking lot to the destination, and a predicted total time for each parking lot, the predicted total time being a sum of the predicted driving time and the predicted walking time;
   a selection unit for selecting an initial parking lot that has a shortest predicted total time, the navigation apparatus providing route guidance along an initial route to the initial parking lot and from the initial parking lot to the destination; and
   a search unit for searching for an alternative parking lot associated with a shorter predicted total time to the destination than the initial route associated with the initial parking lot when traffic congestion subsequently develops along the initial route, the navigation apparatus then providing alternative route guidance to the alternative parking lot and from the alternative parking lot to the destination.

9. A navigation apparatus according to claim 8, further comprising a predicted congestion unit for acquiring information associated with traffic congestion predicted to occur,
   wherein when the traffic congestion information acquired by the predicted congestion unit indicates that traffic congestion will probably occur in an area near the destination, the selection unit selects a parking lot having the shortest predicted total time calculated taking into account the predicted traffic congestion.

10. A navigation apparatus according to claim 9, wherein
the route setting unit determines a route from the current destination to a next destination; and
when the traffic congestion information acquired by the predicted congestion unit indicates that traffic congestion will probably occur along the route from the current destination to the next destination at the current destination departure time, the selection unit selects a parking lot having the shortest predicted total time calculated for traveling to the next destination taking into account the predicted traffic congestion.

11. A navigation apparatus comprising:
a storage unit for storing the location of a destination;
a route setting unit for determining a route to the destination;
a time calculation unit for calculating a predicted driving time needed to drive to a parking lot on the route and a predicted walking time needed to walk from the parking lot to the destination;
a congestion information unit for determining current traffic congestion along the route in an area near the destination; and
a display that (1) displays driving route guidance from a current location to the parking lot, (2) displays walking route guidance from the parking lot to the destination, the driving route guidance being distinguishable from the walking route guidance as shown on the display, and (3) visually distinguishes areas along or in the vicinity of the route that are associated with congestion from non-congested areas.

12. A navigation apparatus comprising:
a storage unit for storing the location of a destination;
a route setting unit for determining a route to the destination;
a time calculation unit for calculating a predicted driving time needed to drive to two or more parking lots on the route, a predicted walking time needed to walk from each parking lot to the destination, and a predicted total time for each parking lot, the predicted total time being a sum of the predicted driving time and the predicted walking time associated with the parking lot; and
a display for displaying a sub-screen for each parking lot simultaneously for side-by-side visual comparison, each sub-screen showing (1) driving route guidance for guiding driving from a current location to the corresponding parking lot, and (2) walking route guidance for guiding walking from the corresponding parking lot to the destination, the driving route guidance being distinguishable from the walking route guidance as shown in the sub-screen.

13. A navigation apparatus according to claim 12, further comprising:
an arrival time predictor for calculating the predicted arrival time at the destination for a selected parking lot; and
a checking unit for checking a schedule to determine whether a current route allows arrival by the specified time by which a user has to arrive at the destination by comparing the predicted arrival time with the time specified in the schedule data.

14. A navigation apparatus according to claim 13, wherein if the current route does not allow arrival by the time specified by the schedule, the checking unit acquires information about alternate transportation and searches for a point that allows arrival at the destination by the specified time if the passenger gets on alternate transportation at the point.

15. A navigation apparatus according to claim 12, wherein the route setting unit determines a route from the destination to a next destination; and
when traffic congestion information acquired by a predicted congestion unit indicates that traffic congestion will probably occur along the route from the destination to the next destination at a destination departure time, a selection unit selects a parking lot having a shortest predicted total time calculated for traveling to the next destination taking into account the predicted traffic congestion.

16. A navigation apparatus according to claim 12, wherein the route setting unit transmits the walking route guidance to a portable information device.

* * * * *